United States Patent
Hardin et al.

(10) Patent No.: US 11,470,397 B2
(45) Date of Patent: *Oct. 11, 2022

(54) METHODS AND APPARATUS FOR INCLUDING AN AUTOMATIC PROGRAM GUIDE CHANNEL AT MULTIPLE LOCATIONS IN A PROGRAM CHANNEL LINEUP

(71) Applicant: Time Warner Cable Enterprises LLC, St. Louis, MO (US)

(72) Inventors: Glen Hardin, Charlotte, NC (US); Niem Dang, Sterling, VA (US); Greg Von Der Ahe, West Port, CT (US); Peter Agnvall, Washington, DC (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 345 days.

This patent is subject to a terminal disclaimer.

(21) Appl. No.: 15/990,819

(22) Filed: May 28, 2018

(65) Prior Publication Data

US 2018/0279008 A1    Sep. 27, 2018

Related U.S. Application Data

(63) Continuation of application No. 15/350,050, filed on Nov. 12, 2016, now Pat. No. 9,986,297, which is a
(Continued)

(51) Int. Cl.
*H04N 21/482* (2011.01)
*H04N 21/84* (2011.01)
(Continued)

(52) U.S. Cl.
CPC ... *H04N 21/4821* (2013.01); *H04N 21/42204* (2013.01); *H04N 21/4383* (2013.01);
(Continued)

(58) Field of Classification Search
CPC ......... H04N 21/42204; H04N 21/4383; H04N 21/44222; H04N 21/4532; H04N 21/466;
(Continued)

(56) References Cited

U.S. PATENT DOCUMENTS 6,337,715 B1 * 1/2002 Inagaki ................ H04N 5/4401
348/553
6,526,577 B1 * 2/2003 Knudson ............ H04N 5/44543
348/E5.104

(Continued)

*Primary Examiner* — Rong Le
(74) *Attorney, Agent, or Firm* — Straub & Straub; Michael P. Straub; Stephen T. Straub

(57) ABSTRACT

Methods and apparatus for improving channel browsing experience for users by presenting an automatically appearing and automatically scrolling program guide are described. The methods and apparatus are well suited for use with remote control devices with limited numbers of input buttons, e.g., under five buttons, but can be used with remote controls with more buttons. The program guide can be used to allow access to a grid guide to users of hospital remotes or other remotes with limited input keys, e.g., an up down arrow and/or a power button. The method in some embodiments uses time spent on a channel in combination with user selection of an input key to determine an action to be taken, e.g., enter or display the program grid guide and/or select a channel and/or corresponding program being displayed in the grid guide.

20 Claims, 12 Drawing Sheets

Related U.S. Application Data continuation of application No. 14/092,641, filed on Nov. 27, 2013, now Pat. No. 9,510,056.

(51) Int. Cl.
| | |
|---|---|
| *H04N 21/466* | (2011.01) |
| *H04N 5/44* | (2011.01) |
| *H04N 21/45* | (2011.01) |
| *H04N 21/442* | (2011.01) |
| *H04N 21/438* | (2011.01) |
| *H04N 21/422* | (2011.01) |
| *H04N 5/445* | (2011.01) |
| *H04N 21/47* | (2011.01) |

(52) U.S. Cl.
CPC ... *H04N 21/44222* (2013.01); *H04N 21/4532* (2013.01); *H04N 21/466* (2013.01); *H04N 21/4668* (2013.01); *H04N 21/47* (2013.01); *H04N 21/482* (2013.01); *H04N 21/4823* (2013.01); *H04N 21/4826* (2013.01); *H04N 21/4828* (2013.01); *H04N 21/84* (2013.01)

(58) Field of Classification Search
CPC ............ H04N 21/4668; H04N 21/482; H04N 21/4821; H04N 21/4823; H04N 21/4826; H04N 21/4828; H04N 21/84; H04N 5/4403; H04N 5/44543
See application file for complete search history.

(56) References Cited

U.S. PATENT DOCUMENTS

| | | | | |
|---|---|---|---|---|
| 7,757,250 | B1 * | 7/2010 | Horvitz | H04H 60/37 |
| | | | | 725/14 |
| 8,819,731 | B2 * | 8/2014 | Leley | H04N 21/4333 |
| | | | | 725/39 |
| 2002/0166126 | A1 * | 11/2002 | Pugh | G07F 17/0014 |
| | | | | 725/78 |
| 2006/0101488 | A1 * | 5/2006 | Cho | H04N 5/4401 |
| | | | | 725/39 |
| 2007/0216667 | A1 * | 9/2007 | Matsuda | H04N 5/4403 |
| | | | | 345/204 |
| 2009/0070809 | A1 * | 3/2009 | Kendall | H04N 5/44543 |
| | | | | 725/39 |
| 2009/0100464 | A1 * | 4/2009 | Migos | H04N 5/44543 |
| | | | | 725/39 |
| 2013/0063664 | A1 * | 3/2013 | Corl | H04N 21/47202 |
| | | | | 348/570 |
| 2014/0059615 | A1 * | 2/2014 | Sirpal | G06F 3/017 |
| | | | | 725/52 |
| 2014/0130100 | A1 * | 5/2014 | Wang | H04N 21/482 |
| | | | | 725/52 |

* cited by examiner

SECOND PROGRAM GUIDE

| SEPT 19, 2013 | 11:00 AM | 11:30 AM | 12:00 PM | 12:30 PM | 1:00 PM | 1:30 PM |
|---|---|---|---|---|---|---|
| 751 HGTVD | HOUSE HUNTERS | HOUSE HUNTERS INTERNATIONAL | AMAZING CHEF | THE COOKING SHOW | BEST RESTAURANTS | |
| 753 A&EHD | THE FIRST 48 | | MODERN DAD | FLIPPING VEGAS | | SHIPPING WARS |
| 755 HDT | MECUM AUTO AUCTION: MUSCLE CARS & MORE | | | | THE HOBBYIST | THE SERVICING EXPERT |
| 757 STZW | ARMORED | | COUNTRY STRONG | | THE HAUNTED | PSYCHO DOCTOR |
| 759 DSCHD | AMERICAN CHOPPER | | CIVIL WAR DOCUMENTARY | MODERN WEAPONS | WAR STORIES | |
| 761 BBTV | MONEY TALK | | INVESTMENT EXPERTS | RICH & FAMOUS | STOCK MARKET NEWS | |
| 763 EDTV | LEARNING MATH | | SCIENCE IS FUN | | LETS LEARN ENGLISH | |

HOUSE HUNTERS: A KENTUCKY WOMAN CREATES A NEW LIFE FOR HERSELF IN CALIFORNIA

FIG. 5

METHODS AND APPARATUS FOR INCLUDING AN AUTOMATIC PROGRAM GUIDE CHANNEL AT MULTIPLE LOCATIONS IN A PROGRAM CHANNEL LINEUP

RELATED APPLICATIONS

The present application is a continuation of U.S. patent application Ser. No. 15/350,050 filed on Nov. 12, 2016 which is a continuation of U.S. patent application Ser. No. 14/092,641 filed on Nov. 27, 2013 each of which is hereby expressly incorporated by reference.

FIELD OF THE INVENTION

The present invention relates to methods and apparatus for easy access and browsing of programs and channel listings for users and, more particularly, to methods and apparatus for providing an automatically appearing program guide that allows a user to automatically scroll through the program guide listings.

BACKGROUND OF THE INVENTION

In conventional systems, customer devices such as set top boxes and/or other devices are often controlled through the use of remote controls with a relatively large number of keys. Remote controls commonly used often include a full set of number keys 0 through 9, up and down channel keys, up and down volume buttons and a power button among others. Such remote controls and their many keys allow users to easily access, scroll though and select programs/channels on grid program guides with a guide or other dedicated key on the remote often being used to gain access to the grid guide.

While remote controls with large numbers of keys work well for most individuals, they can be difficult for some individuals. For example, individuals with physical disabilities, eye sight limitations and/or other limitations may find it difficult to distinguish between different buttons and/or reliably press individual buttons on a remote control with a large number of buttons. For this reason, hospitals, rehabilitation centers and/or other locations where handicapped or physically impaired individual may be located often use relatively simple remote controls making it easy for an individual using such a remote control to access and use advanced control functions such as a grid program guide to select program channels and/or individual programs to watch.

In the cases of the simplest remote control, a user may be limited to up and down arrows for changing channels with another button for calling for help and possibly a button for powering the display device on and off. With such basic remotes it has proven difficult to provide users meaningful access to grid based program guides and/or to allow the users to select program channels and/or programs from such guides. Sadly, this often reduces a user of such a remote to hopping from channel to channel while the channel is displayed in the hope of finding something to watch. Where a large number of channels are supported, this may be frustrating in that the user may not want to flip through all the channels in an attempt to find something of interest particularly in cases where it may take the user a few seconds of viewing to try and figure out what program is being displayed on a channel.

As should be appreciated a hospital user normally does not have the ability to select what type of remote control he/she would like and the hospitals often provide bed side remote controls with very limited functionality so that even the most handicapped of patients can use the remote control to control a set top box used to provide television programming and/or other video to the user.

In view of the above discussion, is should be appreciated that there is a need for methods and/or apparatus which could improve the experience provided to a user of a remote control with a relatively limited number of buttons. In particular it would be desirable if methods and/or apparatus could be developed which would allow a user of a remote control with relatively few keys to access a grid based program guides and select content listed in such a guide. While it is desirable that the new methods and apparatus be suitable for use with remote controls with relatively few keys, it would be desirable if at least some of the same methods and/or apparatus could be used with remote controls having a relatively large number of keys, e.g., more than 12 keys as well thereby allowing users of more advanced remotes to use the same type of interface as users of less complicated remotes should they choose to do so.

In view of the above, there is a need for improved methods and/or apparatus that allow users to easily access and scroll through program channel listings and/or other available programming information, e.g., using a remote control with relatively few buttons.

SUMMARY OF THE INVENTION

Methods and apparatus for providing a program guide interface that is well suited for remote control devices with relatively few keys, e.g., less than 10 keys, are described. The interface and guide related methods and apparatus provide access to, e.g., channel listings and program information, by taking into consideration the time a user stays on a program channel in combination with input from one or more input keys, e.g., up and/or down arrow keys. Various features of the embodiments described herein allow a user of a remote control to interact with a program guide, e.g., a grid program guide. In some embodiments, as few as two input keys, are used to control interaction with the guide and to make program channel and/or program selections. The methods and apparatus are particularly well suited for use with remote controls such as those in hospitals where the control buttons for controlling a television may be limited to an up and down arrow in addition to a power button for powering a televisions on and/or off. As will be discussed below, two buttons, e.g., up and down control buttons of a remote in some embodiments, are used in combination with time, e.g., between button selections, to control and interact with a program guide. The program guide in some embodiments is a grid guide.

In various embodiments after a television (TV) is powered on, a user may switch between channels which are displayed on the TV using the up and down arrows to move from channel to channel as the program is being displayed. After dwelling on a channel for at least a predetermined time, where a dwell is a period of time during which a user remains on a program channel without pressing a channel change button, e.g., up and/or down channel button, upon making a channel up or down selection a user is presented with a program guide. In at least some embodiments the program guide is a grid guide with the channel that was being presented at the time the channel change button was pressed being presented in the center of the displayed grid.

In at least one embodiment the program guide automatically scrolls to present program listings corresponding to the channels in the direction of the channel change button that was pressed. For example, pressing a channel up option after a predetermined dwell on a channel being viewed would trigger presentation of the grid guide with the current channel be presented at the center of the grid guide. Absent the user pressing a channel change button the guide will automatically scroll with a highlighted program channel, e.g., a program channel displayed in the center of the guide, changing as the scroll operation proceeds. In response to the system, e.g., STB or TV detecting user selection of a channel change button while the program guide is displayed, the highlighted program channel is selected and presented to the user in place of the grid guide. To return to the grid guide the user need to simply wait for the predetermined time without changing channels and the grid guide will again be presented to the user with the program channel being presented as the highlight program corresponding to the one that was being viewed at the time the user entered the program guide.

The scroll rate and/or dwell time used as part of the grid interface may be configured by a system administrator, cable network headend or even the user in some embodiments.

While the program guide interface is well suited for use with remote controls with limited buttons, it can also be used with remote controls with more buttons. For example, some remotes may include a program guide button in addition to up and down arrow buttons. In one such embodiment pressing of the program guide button triggers entry into the program guide. Initially pressing of the up or down button once within the guide triggers scrolling through channels in the number order indicated by the up/down arrow key, e.g., selection of the up arrow triggers scrolling in the up channel number direction with higher number channels being presented as part of the scroll operation and pressing of the down channel key being used to cause lower number channels to be sequentially presented as part of a scroll operation.

While dwell time and scroll rate may be set by a system administrator, cable network headend or user, in some embodiments one or more control parameters are dynamically varied based on the results of monitoring the user's use of the remote control. For example, in some embodiments the sequence of control keys selected by a user is monitored and one or more parameters is altered based on the detected key sequence. For example, in one embodiment if the set top box or other device implementing the method detects user selection of an arrow corresponding to the direction opposite the direction used to enter the program guide, the dwell time required to trigger reentry to the program guide is reduced for the time interval following the selection of the opposite arrow key. Thus, a user who wants to scroll through the program guide in the opposite direction can quickly re-enter the program guide and scroll in the opposite direction by pressing the key in the desired scroll direction without having to wait the normal dwell time before being able to re-enter the program guide using the key for scrolling in the opposite direction than was last used to enter the program guide. The reduced dwell time is used for the period immediately following selection of the arrow key opposite that used to previously enter the program guide but the normal dwell time is used to control entry into the program guide.

In some embodiments how quickly a user flips between channels as part of a channel surfing operation outside of the program guide is monitored and the scroll rate used to control the scrolling during guide presentation rate is determined, at least partially, based on the rate between channel change selections made by the user. Other user behavior may be monitored and used in determining or adjusting the scroll rate, dwell time and/or other interface settings.

In at least one embodiment, an exemplary method of operating a user device, comprises: monitoring a dwell time on a channel; determining, in said user device, if the dwell time exceeds a predetermined dwell time threshold used to enable program guide presentation; and automatically displaying a program guide in response to a user channel change selection when the dwell time exceeds the predetermined dwell time threshold.

Various additional features and advantages of the present invention are discussed in the detailed description which follows.

BRIEF DESCRIPTION OF THE DRAWINGS

FIG. 5 illustrates an exemplary second program guide including channel and program listings which may be displayed to a user, in accordance with the invention.

DETAILED DESCRIPTION

Figure 1:
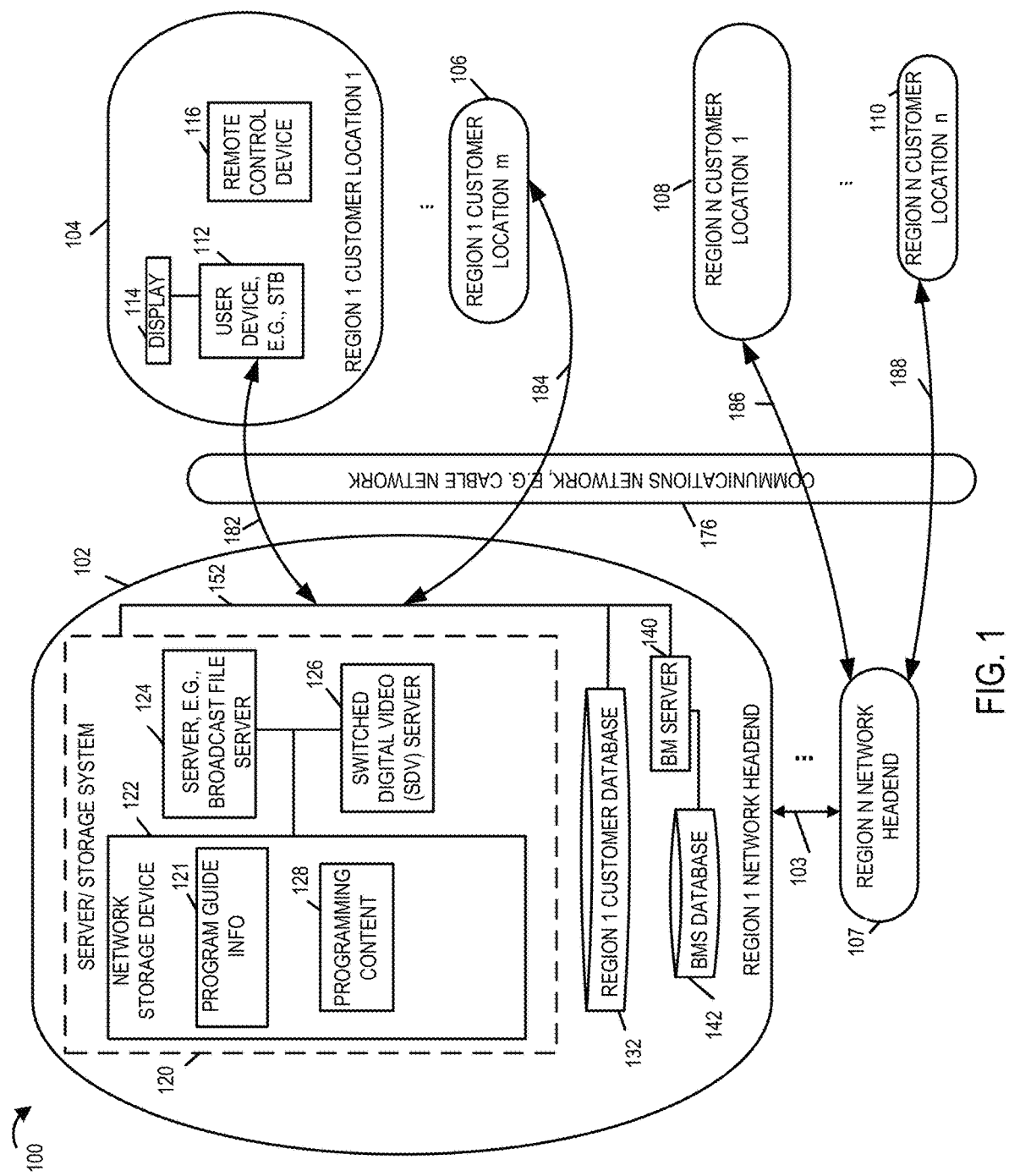
FIG. 1 illustrates an exemplary communications network implemented in accordance with the present invention.

FIG. 1 illustrates an exemplary content delivery and distribution system 100 implemented in accordance with the invention. The system 100 supports the provisioning of content delivery services, as well as user content selection, communication of content and/or other program information to a user device, e.g., set top box, and billing for content provided to customers in accordance with various embodiments of the present invention. Exemplary system 100 includes a plurality of N regional service provider systems in the form of regional headend systems 102, 107. The N regional service provider systems include the first network head end system 102 corresponding to a first region, i.e., Region 1, and a region N service provider system in the form of headend system 107 corresponding to region N.

Each regional service provider system, e.g., region 1 network headend 102, region N network headend 107, provides services, e.g., content delivery services, via communications network 176, to a corresponding set of user devices at customer locations 104, 106, 108, 110 which correspond to the region serviced by the particular headed system. For example, region 1 network headend 102 provides services to the M customer locations 104, 106 corresponding to Region 1 while Region N network headend 107 provides services to region N customer locations 1 through N 108, 110. As should be appreciated the number of customer locations M and N, respectively, will vary depending on the particular region and the number of customer locations in the individual region. The customer location may be, e.g., customer premise such as customer's home, or another place where the customer is using a user device such as a set top box to receive the services, e.g., to view TV programming content. Such places may include hospitals, hotels, restaurants, offices etc. In some embodiments the communications network 176 is, e.g., a hybrid fiber-coaxial (HFC) network, satellite network, and/or internet. In various embodiments the content, e.g., multimedia content, is delivered from the headends over the communications network 176 to one or more devices at the customer locations.

Each of the regional service provider systems such as network headend 102, 104 may be implemented at a cable network office or hubsite serving a plurality of customer locations and includes multiple servers and databases which are coupled together as shown. Region 1 network headend 102 includes a server/storage system 120, a region 1 customer database 132, and a business management (BM) server 140 which in turn is coupled to a BMS (business management system) database 142. The customer database 132 is used to store customer account information, e.g., customer name, address, customer device, e.g., STB, identification information, customer device capability information, and information about customer subscribed services. The business management server database 142 coupled to business management (BM) server 140 includes customer billing information. As should be appreciated the BMS database 142 may be, and in some embodiments is, integrated with the customer database 132. It should be appreciated that some of the servers and/or elements shown to be included in the headend 102 may reside outside the headend 102 in some embodiments and may be located anywhere in the system 100, e.g., in a distributed manner. In the FIG. 1 example, various servers and other elements included in the headend 102 are coupled together by a local network 166.

The server/storage system 120 includes a content server, e.g., a broadcast file server (BFS) 124 and/or an on-demand content server, a switched digital video (SDV) server 126 and a network storage device 122 which are coupled together as shown. Network storage device 122 stores programming content, e.g., audio and video content which may be delivered either as part of a content broadcast by server 124 and/or by the SDV server 126 in response to a user request for content received via network 176 from one or more devices at customer locations 104, 106. The various servers present in the network headend 102 are coupled together via a bus 152 over which they may interchange data and information and which can be used to supply content to the communications network 176 for delivery to various user devices such as STB 112.

The broadcast file server (BFS) 124, among other things, is responsible for delivering, e.g., broadcasting, content including program content and/or other information to one or more customer devices, e.g., set top boxes, which support receiving content by tuning to, e.g., QAM broadcast stream broadcast by the server 124. The switched digital video (SDV) content server 126 provides content and/or other information to one or more customer devices which support receiving SDV content. In various embodiments the content servers 124, 126 access the programming content from the storage device 122 and generate transport streams suitable for delivery to various customer devices via the communications network 176.

As shown in FIG. 1, region 1 customer location 1 104 is coupled to region 1 network headend 102 via communications network 176 which can, and in some embodiments is, implemented as a cable network. Communications link 182 traversing the communications network 176 couples customer device 112 to the region 1 network headend's bus 152. Similarly, devices at region 1 customer location m 106 are coupled to region 1 network headend bus 152 via link 184.

Region N customer location 1 108 is coupled to region N network headend 107 via a communications link 186. Similarly, region N customer location n 110 is coupled to region N network headend 107 via a communications link 188. The network headends 102, 107 of the different regions are coupled together, e.g., via link 103 which may be over a back haul fiber optic network used to connect headend offices 102, 107. Network storage device 122 includes programming content 128 including, e.g., movies, content of regional favorites, content of seasonal favorites, etc., which can the delivered to the customer devices located at the customer locations 104, 106. The delivery of video and/or other content may, and normally is through servers 124 and 126. Network storage device 122 also includes program guide information 121 and broadcast information 125. The program guide information 121 provides channel guide information. This information is communicated to the customer devices and can be used for generating a program guide displayed to a user. The program guide information 121 is shown as being stored in network storage device 122 but may, and in some embodiments is, stored in memory within the servers 124, 126 and communicated to the customer devices, e.g., STBs, via communications network 176. In accordance with one aspect, in some embodiments the program guide information 121 includes information and/or applications that allow a customer device, e.g., STB 112, to generate automatic program guides, e.g., auto appearing and auto scrolling guides. Such information and/or applications may be, and in some embodiment is, communicated to one or more devices periodically. However in some embodiments the information 121 is not communicated periodically to all the customer devices in the region 1 but rather upon a request from one or more devices, e.g., STBs.

As will be discussed, in accordance with one feature of some embodiments, the program guide information 121 is used by a customer device to generate an automatic program guide, to present to the user/customer.

Business management server 140 generates and processes billing information corresponding to region 1 customers, e.g., processing bill payment information, processing discount and/or coupon information, updating billing charge information in response to upgrades, video on demand purchases, and/or other activity.

Referring now to the customer side of system 100. Each customer location in a region may include a plurality of customer premise equipments (CPEs). In various embodiments the CPEs located at the customer locations include, e.g., modems, routers, and user devices including, e.g., set top box, interne capable TVs, personal computers, laptops, tablet devices, smart phones etc. In various embodiments a user device such as a set top box presents the program content to a viewer, e.g., customer/subscriber. FIG. 1 shows some details of customer location 104. Other customer locations 106, 108, 110 may be similar to the customer location 104 and may include same or similar CPEs.

As shown, region 1 customer location 1 104 includes a first set of equipments including, e.g. a set top box (STB) 112 in combination with display 114 and a remote control 116. STB 112 is shown coupled to display 114, which may and in some embodiments is, a television set. However, it should be appreciated that the STB 112 can be integrated in a device which also includes the display 114. The STB 112 may, and often does, include Digital Video Recorder (DVR) functionality, program guide modification and presentation capabilities. In some embodiments the remote control 116 is a limited functionality remote control with limited number of buttons, e.g., 2-4 buttons. In some embodiments the remote control 116 is a fully functionality standard remote control device with all the standard buttons/keys normally provided in standard remote controls.

Figure 2A:
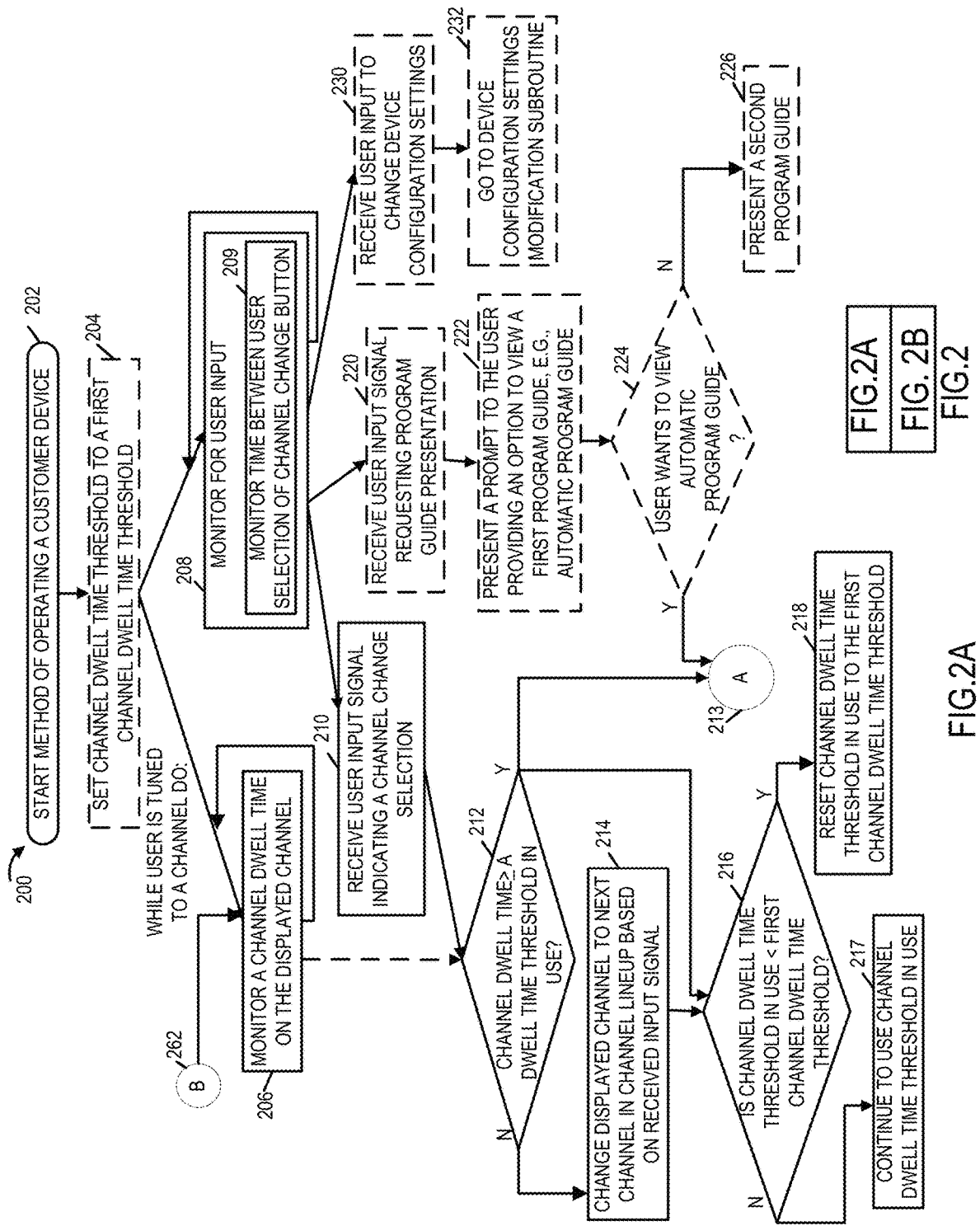
FIG. 2, which comprises the combination of FIGS. 2A and 2B, is a flowchart illustrating the steps of an exemplary method which can be performed by an exemplary user device, in accordance with the invention.
Figure 2B:
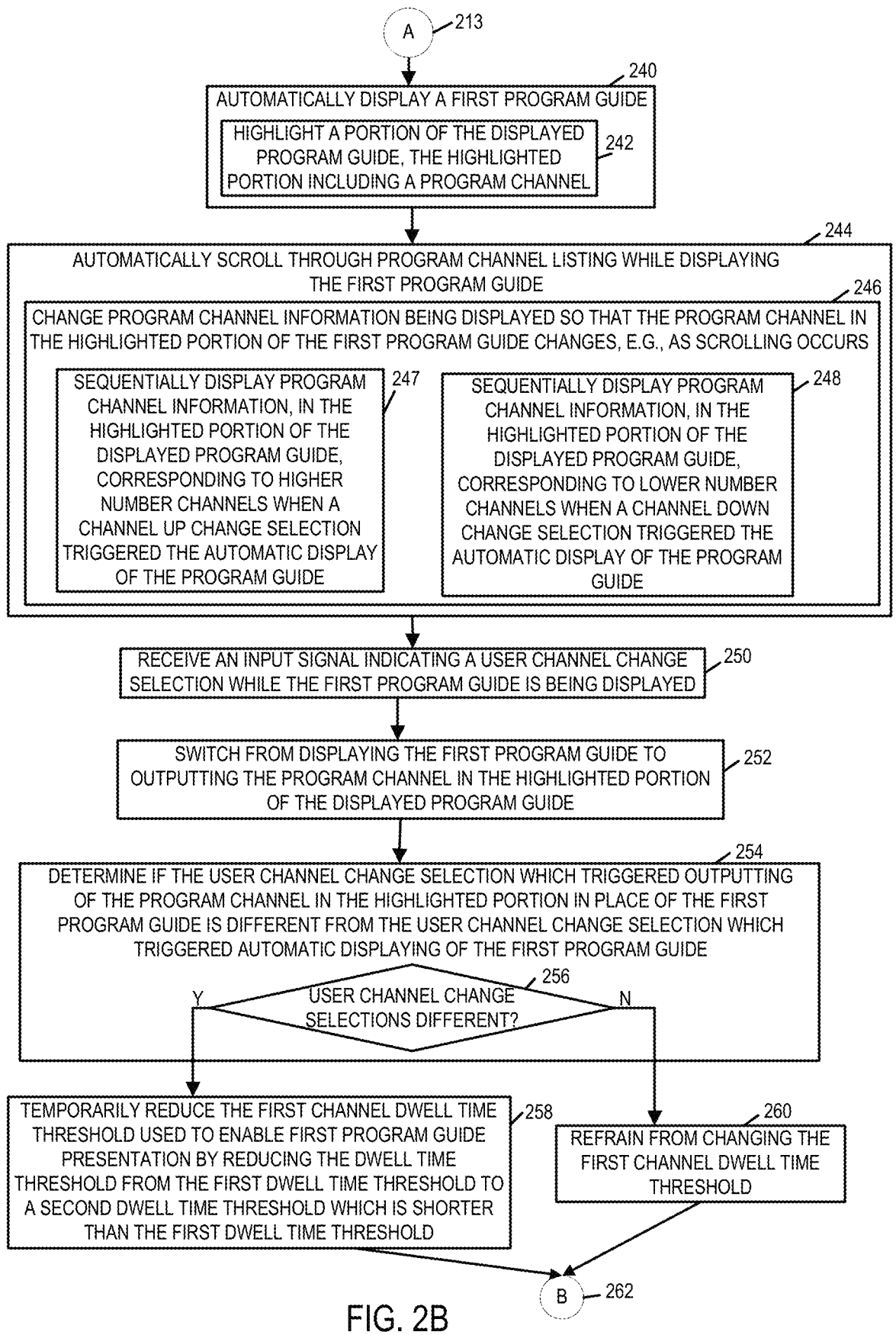

One exemplary embodiment will now be described with reference to FIG. 2. FIG. 2 which comprises the combination of FIGS. 2A and 2B, is a flowchart 200 illustrating the steps of an exemplary method of operating a user device, in accordance with the invention. The method of flowchart 200 can be, and in some embodiments is, performed by a user device such as a set top box, e.g., STB 112 of FIG. 1. The exemplary method starts in step 202 where the user device is powered on and initialized. Operation proceeds from step 202 to step 204 which is optional and is performed in some embodiments. In step 204 a channel dwell time threshold is set to a predetermined channel dwell time threshold, e.g., a first channel dwell time threshold. In some embodiments the predetermined dwell time threshold is set prior to use by one of a system administrator, cable network headend operator, or user. Channel dwell time is a time a viewer dwells on a displayed channel without making any channel change selections. Thus the channel dwell time is the time elapsed on any displayed channel to which the user device is tuned from the time displaying of the channel started, without any channel change input signal being received by the user device, e.g., from a user remote control. As discussed below, the channel dwell time spent on a displayed channel is used in accordance with one feature of the invention in determining if an automatic, e.g., auto appearing and auto scrolling, program guide is to be automatically displayed. In some embodiments when step 204 is not performed the user device, e.g., STB, uses a default predetermined channel dwell time threshold which is preconfigured.

For discussion purposes, consider that the user/customer has enabled automatic program guide display. In some embodiments the automatic program guide display is enabled by default, however the user may disable this feature. In accordance with one aspect, when automatic program guide display is enabled, the user device automatically displays the automatic program guide upon the user's selection of channel up/down button provided that channel dwell time exceeds the channel dwell time threshold in use, e.g., the user has dwelled on a program channel for equal to or greater than a predetermined channel dwell time threshold. In various embodiments the customer device receives and processes the program guide information 121, e.g., from a server located at a network headend or another device which provides program guide information either on a regular basis and/or on request. The program guide information 121 is used in various embodiments to generate a program guide for presentation to the user.

Operation proceeds from step 204 to steps 206 and 208 which may be performed asynchronously in parallel. Step 206 is performed while the user device is tuned to a channel which is displayed to the user, e.g., on TV. In step 206 a channel dwell time on the displayed channel is monitored. The user device tracks the time for which the user dwells on the displayed channel. The displayed channel may be the last channel viewed by the user, e.g., prior to the user device being turned on in step 202, or it could be a channel displayed in response to user's selection. Regardless of how the channel was selected or which channel is being displayed, the channel dwell time is monitored staring from the time the channel starts displaying. The monitoring step 206 is performed on an ongoing basis, e.g., with the monitoring operation restarting every time a different channel is displayed to the user. In various embodiments the monitored dwell time is provided an input (indicated by the broken arrow) to step 212 discussed below.

In step 208, which is performed independently in parallel with step 206, the user device monitors for user input signal, e.g., from a remote control. In some embodiments as part of step 208, sub step 209 is performed wherein the user device monitors the time between user selection of channel change buttons, e.g., channel up/down buttons. For example, in some embodiments the user device monitors time between receipt of signals indicating a channel change from the user. As part of sub step 209 in some embodiments it is monitored how quickly a user flips between channels as part of channel surfing outside of the program guide, e.g., when program guide is not displayed. The user may and often does perform channel change using buttons on the remote control remote, however channel change selection can also be made using buttons on the user device, e.g., STB, or buttons on the TV.

Operation proceeds from step 208 to one of steps 210, 220 and 230 depending on the type of user input received by the user device. Also, steps 220, 222 through 228 which are shown using broken/dashed line boxes are optional. These optional steps are performed in some embodiments where a user of the user device implementing the method 200 uses a full functionality remote control device. The other steps which are not shown in broken line boxes are performed in most embodiments where the user device is being controlled using a limited functionality limited button/key remote control in accordance with the invention.

In step 210 a user input signal indicating a channel change selection is received, e.g., from a remote control device. The channel change selection may be, and in some embodiments is, a channel change selection caused by pressing of an up/down button on the remote control. Thus in some embodiments the user device receives control signals, e.g., user input signals, from the remote control. In some embodiments the remote control device does not include number keys for controlling program channel selections. In some embodiments remote control device includes only up and down arrow buttons for controlling program channel selections. Operation proceeds from step 210 to step 212. In step 212 it is determined if the channel dwell time for which the user stayed on the displayed channel exceeds or equals a channel dwell time threshold in use. The channel dwell time threshold in use may be the default threshold value or the value set as the first channel dwell time threshold in step 204, or may be a different threshold value depending on whether any temporary reductions/changes were made to the first channel dwell time threshold as discussed later in detail. The channel dwell time is received as an input from step 206. The user device compares the channel dwell time for which the user dwelled on the displayed channel to the channel dwell time threshold in use. If in step 212 it is determined that the user has not dwelled on the displayed channel for greater than or equal to the channel dwell time threshold in use, the operation proceeds from step 212 to step 214. In step 214 the user device changes the displayed channel to the next channel in the program channel lineup based on the received user input signal (step 210), e.g., by tuning to the next channel and outputting. For example if the user received input signal in step 210 was caused by a channel up button on the remote control, the user device changes to the next higher numbered channel. Operation proceeds from step 214 to step 216.

If in step 212 it is determined that the channel dwell time is greater than or equal to the channel dwell time threshold in use, the operation proceeds from step 212 to step 240 via connecting node A 213 which is discussed later. The operation also proceeds from step 212 to step 216 as shown in FIG. 2A.

Returning to step 216. In step 216 it is determined if current channel dwell time threshold in use is less than the first channel dwell time threshold or the default channel dwell time threshold. If it is determined that the current channel dwell time threshold in use is less than the first channel dwell time threshold or the default channel dwell time threshold the operation proceeds to step 218, otherwise the operation proceeds to step 217 in which the user device continues using the channel dwell time threshold in use. In step 218 the channel dwell time threshold in use is reset to the first channel dwell time threshold or the default channel dwell time threshold.

Referring now to the processing path including the optional steps 220 and 230. Such steps are performed in some embodiments where a comprehensive, e.g., full key, remote control is used to control the user device performing the method. For these steps, it is considered that the automatic program guide display is not enabled initially and rather the user will be provided an opportunity to either view automatic program guide or a non-automatic program guide. In step 220 a user input signal indicating a user request for program guide presentation is received. For example in the full functionality-full key/button remote control embodiments this occurs when a user presses a program guide button on the remote control. Operation proceeds from step 220 to step 222 wherein upon receiving the program guide request the user device presents a prompt on the display device to the user providing an option to view a first guide, e.g., an automatic program guide, in place of the program guide that the user may have been normally viewing. The prompt in some embodiments also includes descriptive information for first timers to learn that the automatic program guide includes the feature of automatic scrolling through program listings in addition to automatically appearing upon the user's selection of channel up/down button while the automatic program guide is displayed provided that channel dwell time conditions in accordance with the invention discussed above are satisfied.

Operation proceeds from step 222 to step 224. In step 224 the user device determines if the user wants to view the first, e.g., automatic, program guide based on user's response to the presented prompt. If the user response indicates that the user does not wish to view the first program guide, the operation proceeds from step 224 to step 226. In step 226 a second, e.g., non-automatic, program guide is presented to the user on the display device, e.g., TV. If in step it is determined that the user wants to view the automatic program guide, the operation proceeds from step 224 to step 240 via connecting node A 213. Furthermore when it is determined that the user wants to view the automatic program guide, the user may also be given an option to enable automatic program guide display for future so that when in future the program guide button on the remote control is selected the user device will present the automatic program guide without prompting the user to choose between different available program guides and waiting for user's response as done in steps 222 and 224.

Figure 3:
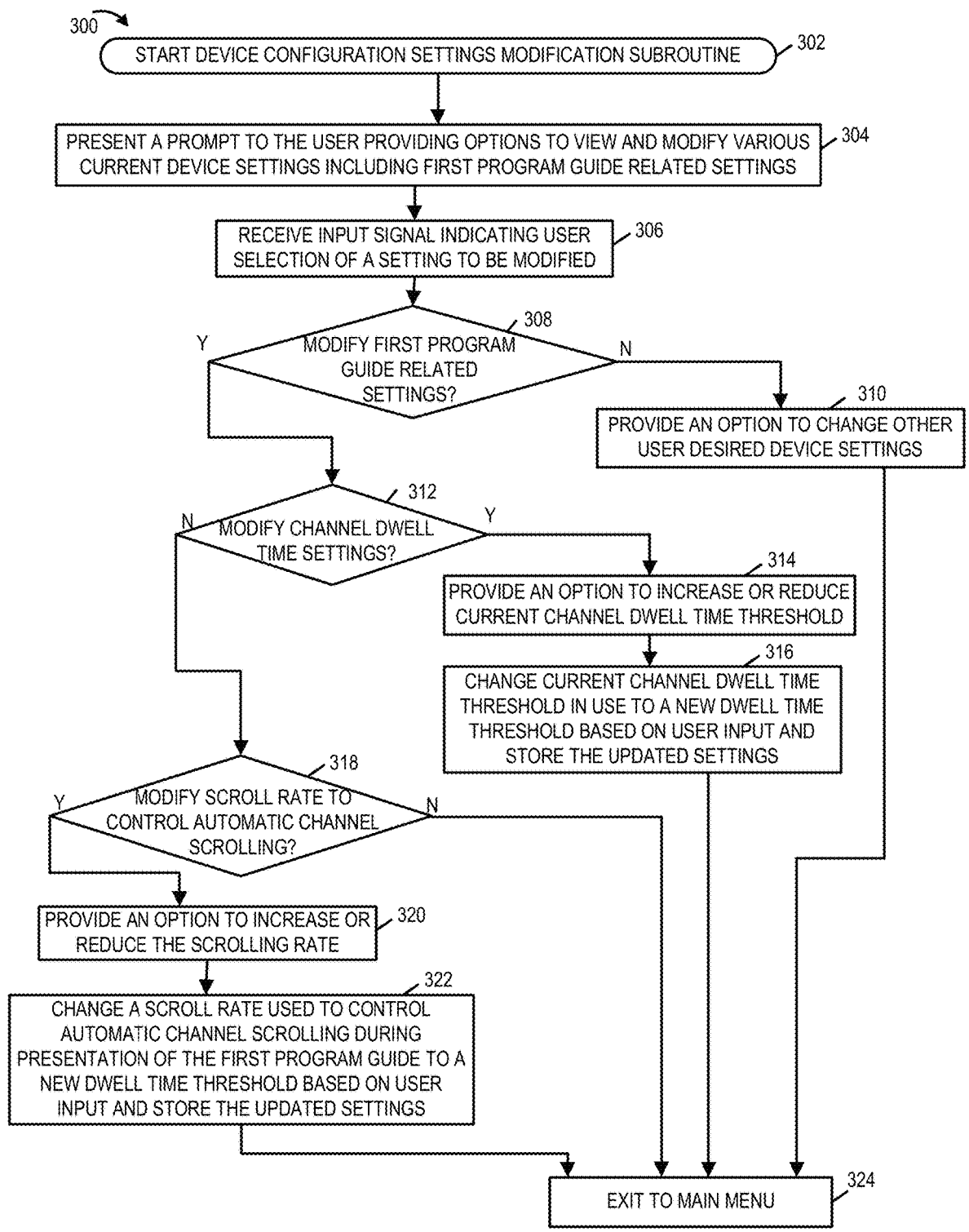
FIG. 3 illustrates an exemplary user device settings modification subroutine implemented in accordance with some embodiments of the invention.

Returning to step 230. In step 230 a user input indicating a request to change device settings is received. In some embodiments where the user device is controlled by a full functionality remote control, the device settings can be accessed by using, e.g., MENU or SETTINGS button provided on the full functionality remote controls. In some embodiments the device settings can be accessed by pressing the MENU button on the remote and then selecting device settings from the items listed in the menu subsequently displayed to the user. In some embodiments the user is provided an option to change one or more default settings on the user device according to user's preference. Such settings include settings for the automatic program guide. Operation proceeds from step 230 to step 232 where the operation proceeds to start device configuration settings modification subroutine which is illustrated in FIG. 3 and discussed later in more detail.

Figure 4:
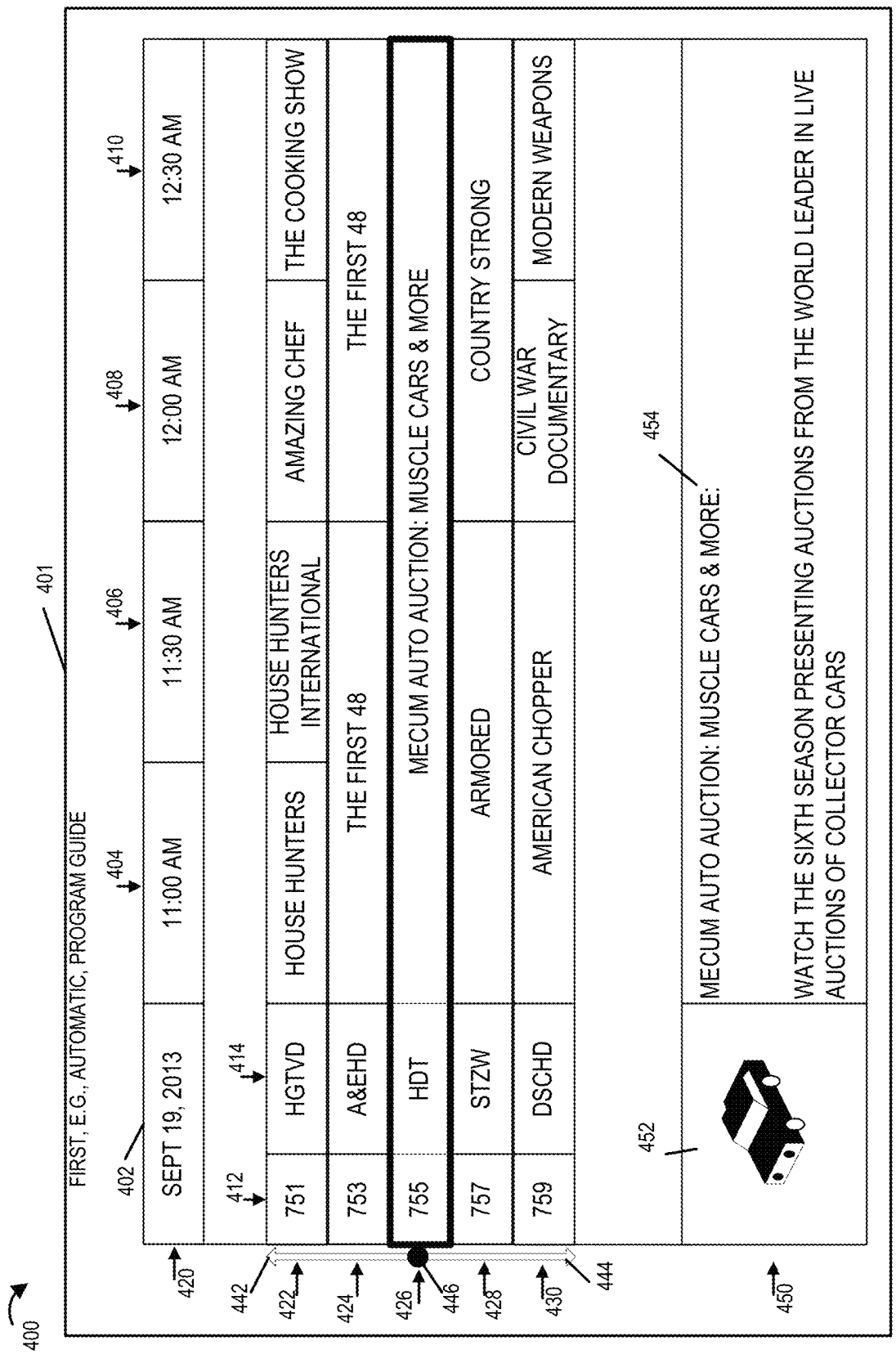
FIG. 4 illustrates an exemplary first, e.g., automatic, program guide including channel and program listings which may be displayed to a user, in accordance with the invention.

Referring now to step 240 illustrated in FIG. 2B. In step 240 the user device automatically display the first, e.g., automatic, program guide, e.g., based on the user input received in step 210 and the determinations performed in step 212 or the user input received in step 220 and determinations performed in step 226. An exemplary first, e.g., automatic, program guide is illustrated in FIG. 4. In some embodiments the automatic program guide is in a grid format and includes program channel listing and information corresponding to, e.g., 5 channels, and a 2 hour time window as shown in FIG. 4. In various embodiments the automatic program guide is displayed in the current context of the channel lineup. For example, if a user selection of up/down button on the remote control caused automatic display of the program guide, the automatic program guide is presented such that the channel and program information corresponding to the channel that was being displayed when channel change selection was made, is displayed in the center and the information corresponding to next few, e.g., 2, channels in the channel lineup being displayed above and below the current channel in the center. This can be appreciated from the program guide illustrated in FIG. 4 discussed later.

In some embodiments as part of step 240, step 242 is performed. In step 242 a portion of the displayed program guide including a program channel is highlighted, the highlighted portion distinguishes the highlighted program channel from the other entries in the program guide. In some embodiments the highlighted portion of the displayed program guide is located at the center of the program guide.

Operation proceeds from step 240 to step 244. In step 244 the user device controls automatic scrolling through the program channel listing while displaying the first program guide. In some embodiments sub steps 246, 247 and 248 are performed as part of step 244. In step 246 the user device controls the displayed program guide to change program channel information so that the program channel in the highlighted portion of the displayed first program guide changes, e.g., as scrolling occurs. Thus it should be appreciated that as automatic scrolling occurs the program channel information in the highlighted portion changes. In some embodiments the focus of the guide is on the current program channel which is highlighted. In some embodiments the focal point stays fixed, centered and highlighted, with the elements, e.g., program channel listings, scrolling into the focal point. In some embodiments how quickly a user flips between channels as part of channel surfing outside of the program guide is monitored (e.g., as part of sub step 209) and the scroll rate used to control automatic scrolling during presentation of the first program guide is determined, at least partially, based on the rate between channel change selections made by the user. In some embodiments other user behavior may be monitored and used in determining or adjusting the scroll rate, dwell time and/or other interface settings.

Depending on what input signal triggered the automatic display of the first program guide, one of steps 247 or 248 is performed. In sub step 247 program channel information is sequentially displayed, in the highlighted portion of the displayed program guide, corresponding to higher number channels when a channel up change selection, e.g., pressing of a channel up button on the remote control, triggers the automatic display of the program guide. For example, if the selection, e.g., pressing on the remote control, of a channel up button caused the automatic display of the program guide, automatic scrolling will occur in the downward direction of higher number channels and thus higher number channels are sequentially displayed in the highlighted portion of the guide, as automatic scrolling occurs. In step 248 program channel information is sequentially displayed, in the highlighted portion of the displayed program guide, corresponding to lower number channels when a channel down change selection, e.g., pressing of a channel down button on the remote control, triggers the automatic display of the program guide. Thus in this case lower number channels are sequentially displayed in the highlighted portion as the auto scrolling occurs.

Operation proceeds from step 244 to step 250. In step 250 a user input signal indicating user channel change selection is received by the user device while the first program guide is being displayed. The input signal indicating user channel change selection is, e.g., a signal from the remote control when a user pressed up or down channel change button. Operation proceeds from step 250 to step 252. In step 252 the user device switches from outputting the first program guide which is being displayed to outputting the program channel which is in the highlighted portion of the automatic program guide at the given time.

Operation proceeds from step 252 to step 254. In step 254 it is determined if the user channel change selection (e.g., pressing of up or down button on the remote control) which triggered the outputting of the program channel in the highlighted portion in place of the automatic program guide is different from the user channel change selection (e.g., pressing of up or down button) which triggered the automatic display of the program guide earlier. For example, the automatic display of the program guide may have been triggered by pressing of an up channel change button after the user dwelled on a program channel for ≥dwell time threshold. The subsequent channel change selection by user while the automatic program guide is displayed that causes the highlighted channel to be displayed however may be the same, e.g., channel up button, or different, e.g., channel down button. This difference in channel change selection inputs during the above discussed situations plays a role as to how the automatic program guide will function, at least temporarily, going forward, e.g., by providing some insight of user intuition based on whether same or different channel change selections were detected by the user device.

In various embodiments the decision step 256 is performed as part of step 254. If in step 254 it is determined that the user channel change selection triggering the outputting of the program channel in the highlighted portion in place of the automatic program guide is different from the user channel change selection which triggered the automatic display of the program guide, the decision step 256 controls the operation to proceed from step 254 to step 258 otherwise if the user channel change selections are the same the operation proceeds to step 260.

In step 258 the user device temporarily reduces the channel dwell time threshold used to enable first program guide presentation by temporarily changing the dwell time threshold from the first dwell time threshold to a second dwell time threshold, the second dwell time threshold being shorter than the first dwell time threshold. For example if the first channel dwell time threshold in use was, e.g., 60 seconds, the user device may temporarily reduce it to, e.g., 45 seconds, in response to the determination performed in step 254. In some embodiments the temporary reduction in the dwell time threshold remains in effect until the temporary dwell time threshold is satisfied or the user makes a channel change selection prior to said temporary dwell time threshold being satisfied. As discussed with regard to steps 216 and 218, if the dwell time threshold in use is less than the first dwell time threshold that has been set, e.g., indicating that the dwell time threshold in use is a reduced dwell time threshold, the dwell time threshold in use is reset to the first channel dwell time threshold thereby limiting the time period for which the reduced dwell time threshold stays in effect. Operation proceeds from step 258 back to step 206 via connecting node B 262.

In step 260 the user device refrains from changing or temporarily reducing the dwell time threshold. The operation proceeds from step 260 back to step 206 via connecting node B 262.

FIG. 3 illustrates an exemplary device settings modification subroutine 300 implemented in accordance with some embodiments of the invention. The device settings modification subroutine 300 is implemented by a user device such as, e.g., STB 112. The device settings modification subroutine 300 is executed following the user device detecting a user input signal indicating a user request to view/change device settings as discussed in steps 230, 232. In various embodiments the subroutine 300 is executed when the user device performs step 232 of method flowchart 200 thereby calling/invoking subroutine 300. Thus the operation starts in step 302 when the call to the subroutine 300 is made.

Operation proceeds from step 302 to step 304. In step 304 a prompt is presented to the user providing options to view and modify various device settings including program guide settings. In some embodiments various options for user selection are presented including, e.g., first (e.g., automatic) program guide settings, second (non-automatic) program guide settings, parental control settings, automatic device power down settings etc. In various embodiments each selectable option provides an opportunity to the user to view and/or modify corresponding settings.

Operation proceeds from step 304 to step 306. In step 306 an input signal indicating user selection of device setting to be modified from the presented options. Operation proceeds from step 306 to step 308. In step 308 the user device determines if the user selection indicates that the user wants to modify first program guide related settings, e.g., based on the user selected option. If it is determined that the user selected option indicates that the user does not want to modify first program guide related settings but rather some other device setting the operation proceeds from step 308 to step 310. In step 310 the user device provides an option to the user, e.g., on the display device, to modify the user selected setting. Accordingly the user can proceed to modify the desired setting. Operation proceeds from step 310 to step 324 wherein the main menu/settings menu screen is displayed.

If in step 308 it is determined that the user selected option indicates that the user wants to modify first program guide related settings the operation proceeds from step 308 to step 312. In step 312 it is determined whether the user wants to modify channel dwell time settings, e.g., by presenting a prompt such as "DO YOU WISH TO CHANGE CHANNEL DWELL TIME SETTINGS?" to the user. Based on user's response, if it is determined that the user wants to modify dwell time settings, the operation proceeds from step 312 to step 314. In step 314 an option is provided to the user to increase or reduce the channel dwell time threshold. Operation proceeds from 314 to step 316. In step 316 the current channel dwell time threshold in use is changed to a new dwell time threshold based on the user input, e.g., in response to the presented option allowing the user to increase or reduce the channel dwell time threshold. The dwell time threshold is updated to the new value and stored. Operation proceeds from step 316 to step 324 wherein the main menu/settings menu screen is displayed.

If in step 312 it is determined that the user does not want to modify channel dwell time settings, e.g., user selects a "NO" option while responding to the option presented in step 312, the operation proceeds from step 312 to step 318. In step 318 it is determined whether the user wants to modify scroll rate setting to change the automatic scrolling rate of the automatic program guide, e.g., by presenting a prompt such as "DO YOU WISH TO CHANGE AUTOMATIC SCROLL RATE SETTINGS?" to the user. Based on user's response, if it is determined that the user wants to modify the scroll rate, the operation proceeds from step 318 to step 320. In step 320 an option is provided to the user to increase or reduce the scroll rate. Operation proceeds from 320 to step 322. In step 322 the current scroll rate which is currently used to automatically scroll through program listings in the first program guide is changed, e.g., increased or decreased based on the user input, e.g., in response to the presented option allowing the user to increase or reduce the scroll rate. In some embodiments the scroll rate is incremented or reduced in predetermined step sizes. For example, a graphical representation of step sizes is shown to the user in step 320 and the user can choose to increase and decrease the scroll rate using up and down buttons on the remote control respectively. The scroll rate settings is updated to reflect the changes and stored. Operation proceeds from step 322 to step 324 wherein the main menu/settings menu screen is displayed.

FIG. 4 illustrates a drawing 400 of an exemplary first, e.g., automatic, program guide 401 including channel listings and program information which may be displayed to a user, in accordance with some embodiments of the invention. The program guide 401 in some embodiments is arranged and displayed in a grid guide format. In accordance with one feature the automatic program guide 401 allows a user to interact, e.g., view listings, browse through and select channels, using a simple limited functionality remote, e.g., with limited number of keys. In some embodiments the remote with limited keys and functionality is a hospital bed remote control device, and/or another control device e.g., such as a pillow speaker. Thus the exemplary first guide 401 implemented in accordance with the invention supports pillow speakers with minimum keys and provide improved browsing experience to the user. While the first program guide 401 is well suited for use with remote controls with limited buttons, it can also be used with full functionality remote controls with more buttons.

The program guide 401 includes a plurality of rows and columns showing information regarding the programming content, e.g., programs, the name of the provider/distributor, e.g., channel network name, and the corresponding scheduled on air time for various programs.

The top row 420 shows the date field 402 and an exemplary two hour time window with exemplary half hour time slots during which a program is available for viewing on a corresponding channel. The programs with duration of more than half hour span over more than one half hour time slot as illustrated in the figure, e.g., extending beyond one half hour time slot. The time slots are identified by reference numbers 404, 406, 408 and 410.

Column 412 of the program guide 401 shows channel number information for various channels listed in the program guide while column 414 shows the name of various channels/distribution networks. Each individual row in the plurality of rows 422 through 430 corresponds to a program channel. Row 422 corresponds to channel number 751, e.g., HGTVD, and illustrates that a program show "HOUSE HUNTERS" is scheduled to be on air during the 11:00-11:30 time slot, a program "HOUSE HUNTERS INTERNATIONAL" is scheduled to be on air during the 11:30-12:00 time slot, a program "AMAZING CHEF" is scheduled to be on air during the 12:00-12:30 time slot, and a program "THE COOKING SHOW" is scheduled to be on air during the 12:30-1:00 time slot.

Row 424 corresponds to channel number 753, e.g., A&EHD channel, and indicates the various programs that are or will be available on the corresponding channel during the different displayed time slots. Row 426 corresponds to channel number 755, e.g., HDT channel, and indicates the various programs that are or will be available on channel 755 during the different displayed time slots. Similarly rows 428 and 430 correspond to channel number 757, e.g., STZW channel, and channel number 759, e.g., DSCHD channel respectively, with each one indicating the programs that are or will be available on the respective channels during the different displayed time slots. Note that in the illustrated embodiment of FIG. 4, row 426 shows the highlighted portion of the automatic program guide 401 including program channel 755, e.g., HDT channel. In various embodiments a circle 446 appears next to the highlighted channel number.

In some embodiments the highlighted portion of the guide 401 stays fixed and when auto scrolling starts, the information corresponding to a channel shown in a row scrolls into the highlighted portion and then moves out, e.g., depending on the scrolling speed. In some embodiments the automatic program guide 401 is displayed, e.g., after being invoked by pressing of a channel up/down button on the remote control following expiration of the channel dwell time. In some embodiments following the display of the automatic program guide 401 the user device waits for a guide dwell time, e.g., 15 seconds, before starting automatic scrolling in the direction of entering the guide, e.g., up or down. The guide dwell time is the time the user stays on the displayed guide without interacting, e.g., pressing channel change selection button, and is preconfigured. However the guide dwell time can be modified by the user. As discussed earlier, in various embodiments the automatic scroll speed is also a configurable setting and can be changed as per user's desire. In accordance with one feature, after the automatic scrolling starts and the user presses either up or down button on the remote control the user device tunes to the program channel in the highlighted portion of the guide 401 and starts outputting the corresponding program content in place of the automatic program guide.

Also shown, on the left side adjacent to the channel number information column 412, are the up and down arrows 442 and 444 respectively. In some embodiments the down arrow 444 is highlighted when automatic scrolling occurs in the downward direction and higher numbered channels subsequently appear as the scrolling occurs. Similarly, in some embodiments the up arrow 442 is highlighted when automatic scrolling occurs in the upward direction and lower numbered channels subsequently appear as the scrolling occurs.

The bottom portion of the program guide includes a row 450 which displays the picture in graphic (PIG) portion 452 and program descriptive information portion 454. In some embodiments the PIG portion 452 is a scaled video window that shows video content, e.g., short video clipping, corresponding to a program on the current channel, e.g., channel in the highlighted portion in he center, with the video displayed in the PIG portion 452 staying fixed and not changing as the scrolling occurs. In some other embodiments the PIG portion 452 is a scaled video window that could be configured to tune to different channels as the guide scrolls, e.g., dynamically changing displayed video content in the PIG portion window 452 corresponding to the program on the channel that is currently highlighted. In such embodiments the displayed video content in the PIG portion 452 changes as different program channels get into the highlighted portion in the center as the scrolling occurs. The descriptive portion 454 includes a description of the corresponding program content that is displayed in the PIG portion 452.

FIG. 5 illustrates a drawing 500 of an exemplary second, e.g., non-automatic, program guide 501 including channel listings and program information which may be displayed to a user, in accordance with the invention. The program guide 501 in some embodiments is arranged in a grid format as illustrated in the figure. The second program guide 501 is displayed to the user in some embodiments when the user decides not to view the first (automatic) program guide. For example in some embodiments when the user device 112 receives a request for a program guide, e.g., receives user input signal from a remote control, and the user declines an offer to view the automatic program guide 401 then the second program guide 501 is displayed.

The second program guide 501 includes a plurality of rows and columns showing information regarding the programming content, e.g., programs, the name of the provider/distributor, e.g., channel network name, and the corresponding scheduled on air time for various programs. The top row 520 shows the date field 502 and a three hour time window with half hour time slots during which a corresponding program is available for viewing on a corresponding channel. The time slots are identified by reference numbers 504, 506, 508, 510, 512 and 514.

In contrast to the automatic program guide 401, the second program guide 501 includes a wider time span window, e.g., 3 hour time span window as compared to the 2 hour window in the automatic guide 401, and accordingly can show more number of programs per channel. Furthermore, greater number of rows, e.g., 7 rows, each corresponding to a different channel are displayed at a given time on the second guide 501 as compared to 5 channel rows in the automatic guide 401. However since the overall size of the program guide 501 remains the same as automatic guide 401, the font size for the information displayed in the second guide 501 is smaller than that in the automatic guide 401. Also as should be appreciated there is no fixed highlighted portion in the second program guide 501. Rather as the user manually scrolls across the rows and columns in the displayed grid format guide, the highlighted portion shift around a user selected channel and/or program on channel in the guide 501. For example reference 515 indicates that the user's current selection on the guide is "HOUSE HUNTERS" with the program name being in the highlighted box. As the user manually scrolls away, the highlighted box will move around to the next user selection. When the user wishes to play a program on a channel listed on the second program guide, the user can simply scroll to the desired program so that the highlighted box is around the desired program on the given channel and then press a SELECT/PLAY/OK button on the remote control, e.g., full functionality and full button remote control. If the user makes a selection of a program on a channel prior to its scheduled on air time, e.g., scheduled on air time has not arrived, in some embodiments the user is presented an option to schedule recording of the selected program when it becomes available.

Column 516 of the program guide 501 shows channel number information for various channels listed in the program guide while column 518 shows the name of various channels/distribution networks. Each individual row in the plurality of rows 522 through 534 corresponds to a program channel. Row 522 corresponds to channel number 751, e.g., HGTVD, and illustrates that a program show "HOUSE HUNTERS" is scheduled to be on air during the 11:00-11:30 time slot, a program "HOUSE HUNTERS INTERNATIONAL" is scheduled to be on air during the 11:30-12:00 time slot, a program "AMAZING CHEF" is scheduled to be on air during the 12:00-12:30 time slot, a program "THE COOKING SHOW" is scheduled to be on air during the 12:30-1:00 time slot, and a program "BEST RESTAURANTS" is scheduled to be on air during the 1:00-1:30 and 1:30-2:00 time slots.

Row 524 corresponds to channel number 753, e.g., A&EHD channel, and indicates the various programs that are or will be available on the corresponding channel during the different displayed time slots. Similarly rows 526 through 534 correspond to different channel numbers, with each row indicating the on air timing and schedule for various programs.

The bottom portion of the program guide 501 includes a row 550 which displays the picture in graphic (PIG) portion 552 and program descriptive information portion 554. In some embodiments the PIG portion 552 of program guide 501 is a scaled video window that shows video content, e.g., short video clipping, corresponding to a program which the user temporarily selected while scrolling through the program guide 501. As the user manually scrolls to different program and channels listed in the second guide 501, the PIG portion 552 displays different short video clippings corresponding to a program which the user temporarily selected while scrolling to provide a preview of the program to the user. The descriptive portion 554 includes a description of the corresponding program content that is displayed in the PIG portion 552.

Figure 6:
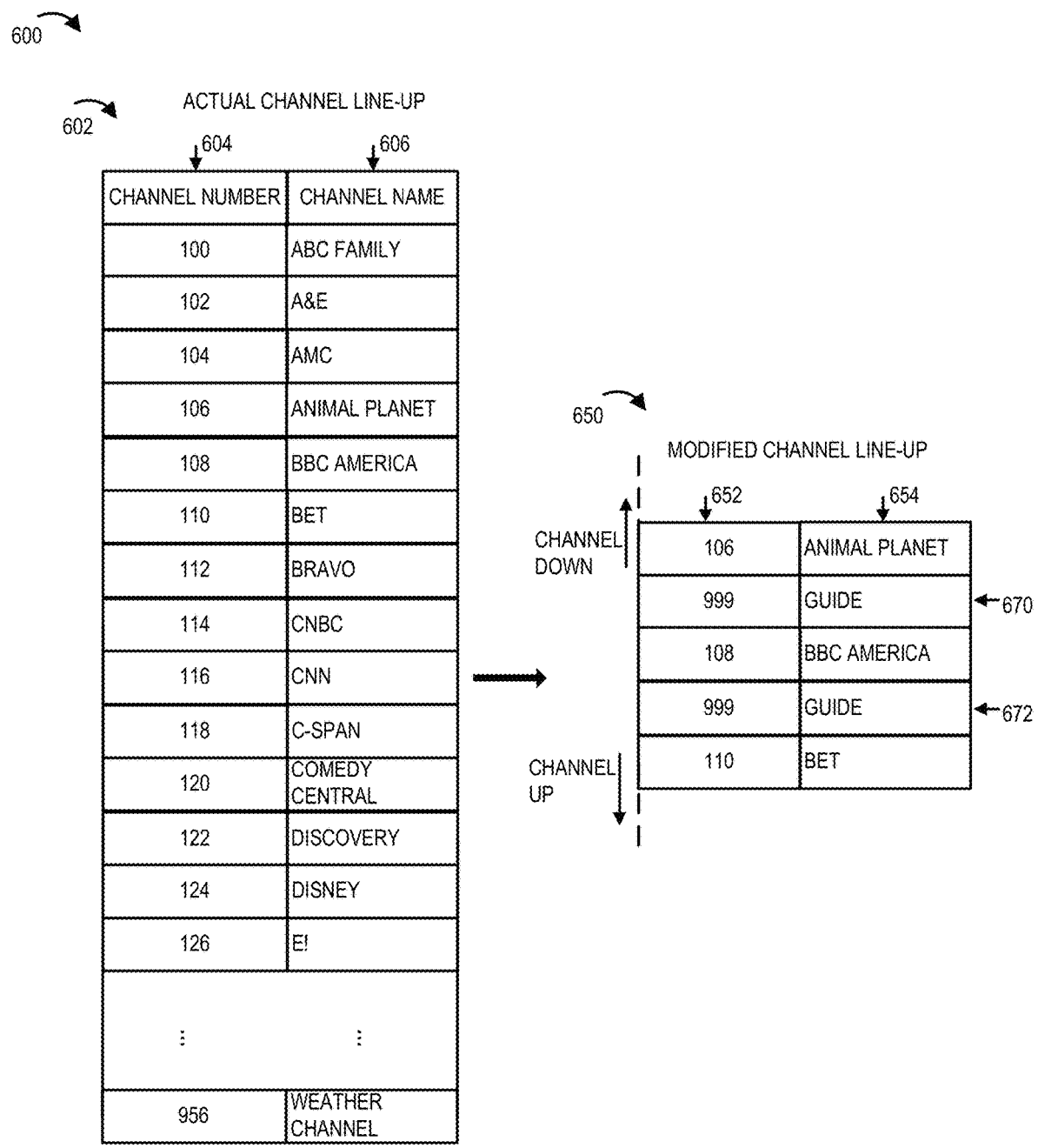
FIG. 6 is a drawing illustrating a concept of logically modifying an actual program channel lineup used by a user device to present programming content, in accordance with one embodiment of the invention.

FIG. 6 is a drawing 600, that includes drawings 602 and 650, illustrating a concept of logically modifying an actual program channel lineup used by the user device, e.g., user device 112, in accordance with some embodiments of the invention. The program channel lineup such as the one illustrated by drawing 602 includes a sequential arrangement of program channels as provided by the service provider, e.g., headend 102. The channel lineup 602 includes information showing which channel number (shown in column 604) corresponds to which network or channel operator/broadcaster (shown in column 606), for example, channel 100 corresponds to ABC Family network and so on. The channel lineup information may be provided by the headend 102 to the user device 112 as part of the program guide information 121 which is used to generate first and second program guides. The tuning parameters and/or other information needed to receive the programming content corresponding to a channel listed in the channel lineup 602 may be included in the supplied channel lineup information or may be provided by the headend 102 in a separate file, e.g., source content file. When a user normally selects a channel using up down button on the remote or using a program guide, the user device uses the channel lineup 602 to retrieve information and parameters for receiving the content corresponding to the channel, e.g., by tuning to the selected channel on a specified frequency.

In accordance with one feature of the invention, when displaying of the automatic program guide is enabled and after the channel dwell time threshold criteria is satisfied, the actual channel lineup such as the one shown by drawing 602 is logically modified such that in the given context an automatic guide channel is placed at the positions of the next channels adjacent to a current channel being displayed. This ensures that when the user presses up or down button on the remote control, after dwelling on any displayed channel for a time greater than equal to the channel dwell time threshold in use, the user device 112 tunes to the automatic program guide channel. A portion of the modified channel lineup is shown in drawing 650. The channel number information is shown in column 652 while the corresponding network or channel operator/broadcaster information is shown in column 654. In various embodiments the modification is transparent to the user and is internally used by the user device and thus a user viewing the program guide does not see a modified channel lineup such as the one illustrated by drawing 650. However when the channel dwell time constraint is satisfied for a displayed channel and the user presses up or down button on the remote control, the user device will tune to the automatic program guide channel and the user will be presented with the first program guide. As illustrated in drawing 650, considering that the user dwells on channel 108, which is "BBC AMERICA" in the actual channel lineup 602, for a period of time greater than equal to the channel dwell time threshold in use, the next adjacent channels, i.e., channel 106 "ANIMAL PLANET" and channel 110 "BET", are temporarily logically shifted by one position so that the automatic guide channel (e.g., channel number 999) is the next channel adjacent to the currently displayed channel 108 as indicated in rows 670 and 672. Accordingly when the user presses up or down button on the remote control the user device will tune to the automatic program guide channel.

At other times when the user is normally flipping through the channels without the dwell time constraint being satisfied for a displayed channel, the user device changes channels in the normal fashion following the actual channel lineup 602.

Figure 7:
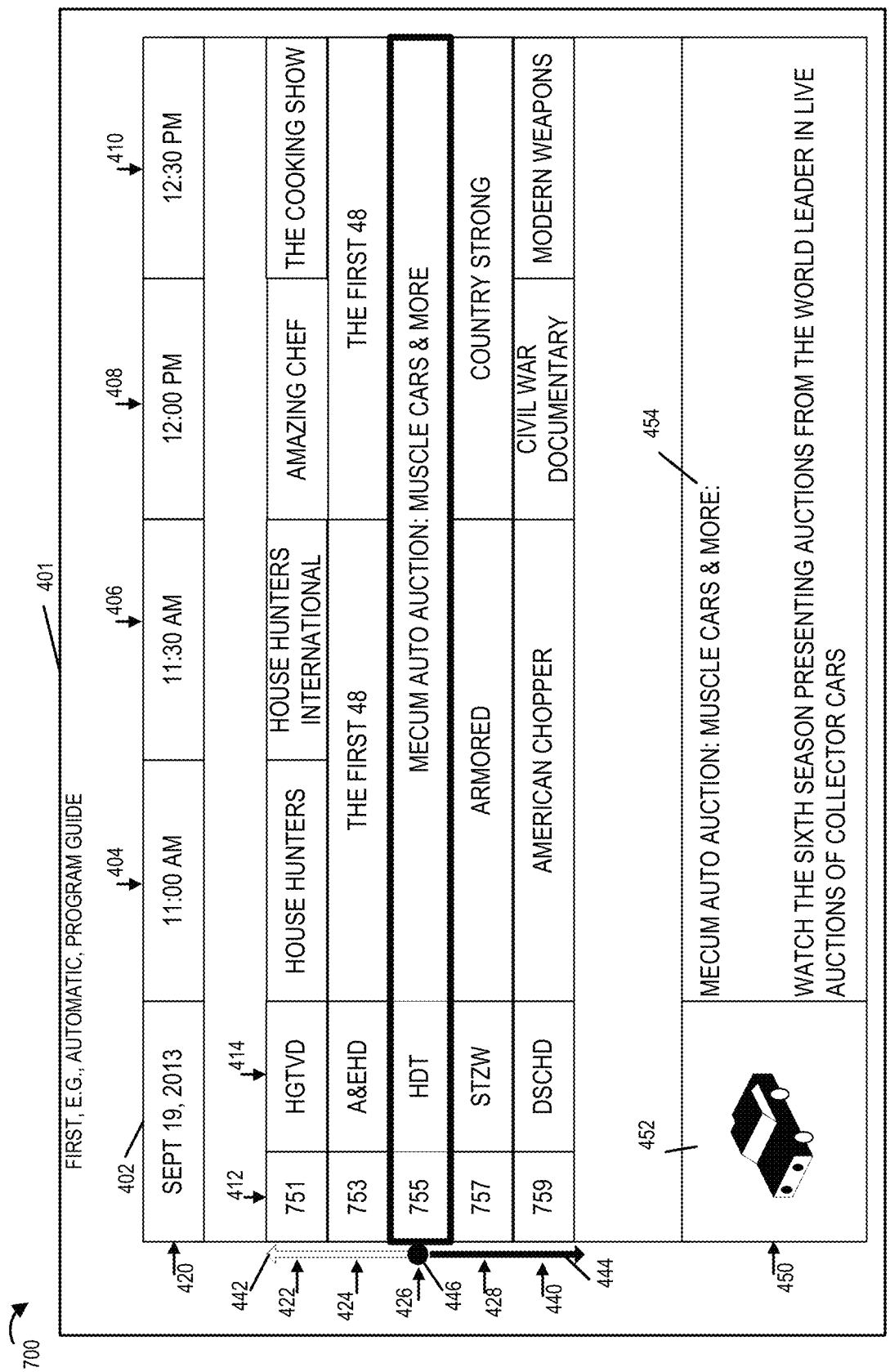
FIG. 7 illustrates a view of the first program guide as displayed to a user after being invoked by pressing of a channel up button on a remote control, in accordance with some embodiments of the invention.

FIG. 7 illustrates a drawing 700 of the exemplary first, e.g., automatic, program guide 401, displayed to a user after being invoked by pressing of a channel up button on the remote control following expiration of the channel dwell time. In accordance with one aspect of some embodiments of the invention when the automatic displaying of the program guide 401 is caused after pressing of a channel up button on the remote control, the automatic scrolling starts in the downward direction to the high number channels and the down arrow 444 gets highlighted as shown in the figure. As discussed earlier in some embodiments the highlighted portion of the automatic program guide 401 stays fixed and when auto scrolling starts, the information corresponding to a channel shown in a row scrolls into the highlighted portion and moves out at a rate determined by the scrolling rate, e.g., which can be set by the user, manufacturer, or a system administrator. In various embodiments a scrolling rate is selected with consideration that a user has sufficient time to read the information program channel and program information appearing in the highlighted portion of the guide and make a decision to select if desired. A circle 446 appears next to the highlighted channel number as shown. After the automatic scrolling starts in the downward direction, pressing either up or down button on the remote control results in the selection of the program channel in the highlighted portion of the guide for display. Thus upon pressing of the up/down button the user device tunes to the program channel in the highlighted portion of the guide 401 and starts outputting the corresponding program content in place of the automatic program guide 401.

Figure 8:
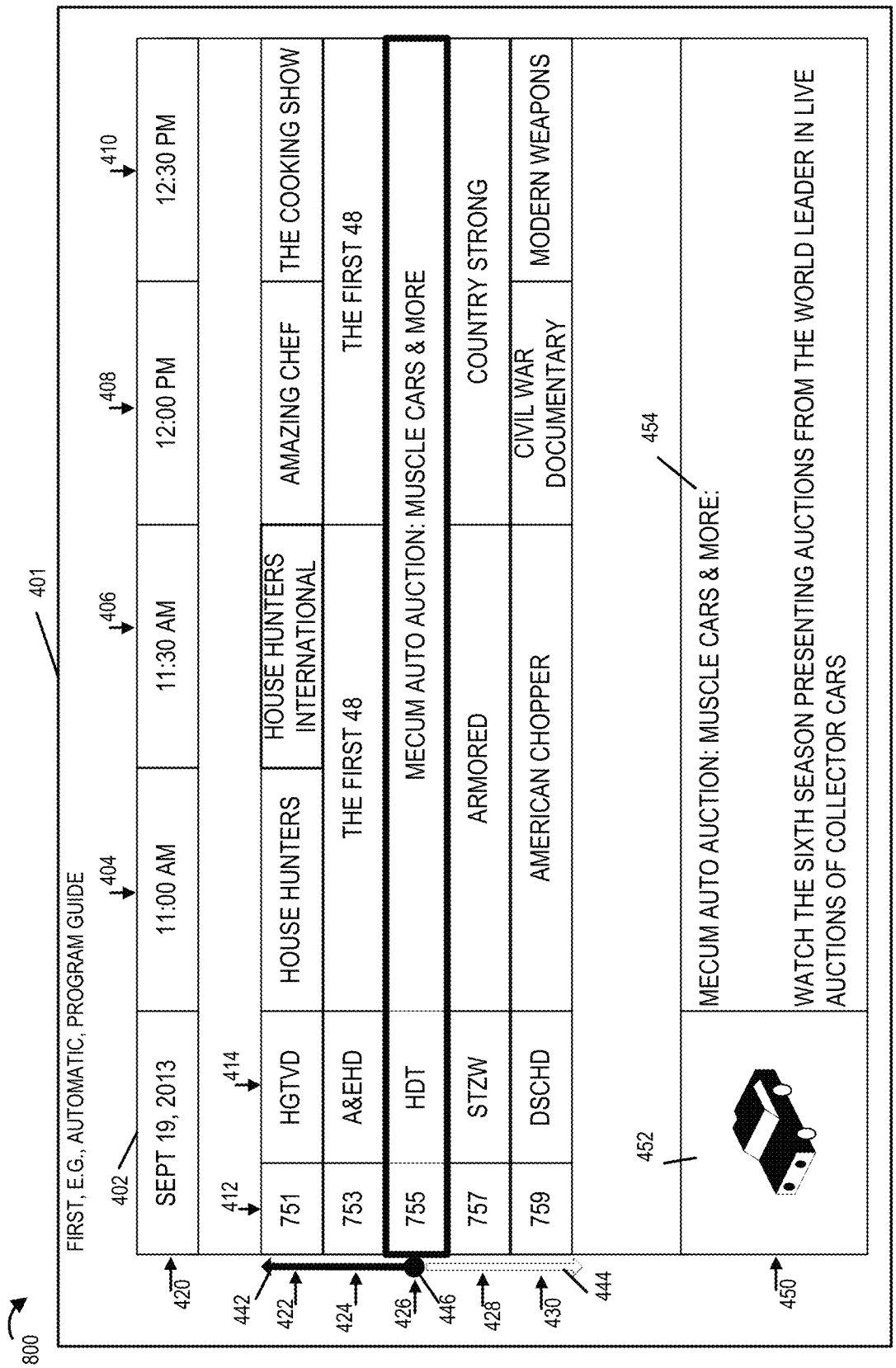
FIG. 8 illustrates a view of the first program guide as displayed to a user after being invoked by pressing of a channel down button on a remote control, in accordance with some embodiments of the invention.

FIG. 8 illustrates a drawing 800 of the exemplary first, e.g., automatic, program guide 401, displayed to a user after being invoked by pressing of a channel down button on the remote control following expiration of the channel dwell time. In accordance with one aspect of some embodiments of the invention when the automatic displaying of the program guide 401 is caused after pressing of a channel down button on the remote control, the automatic scrolling starts in the upward direction to the lower number channels and the up arrow 442 gets highlighted as shown in the figure. A circle 446 appears next to the channel number in the highlighted portion of the guide as shown. After the automatic scrolling starts in the upward direction, pressing of either up or down button on the remote control results in the selection of the program channel in the highlighted portion for display.

Figure 9:
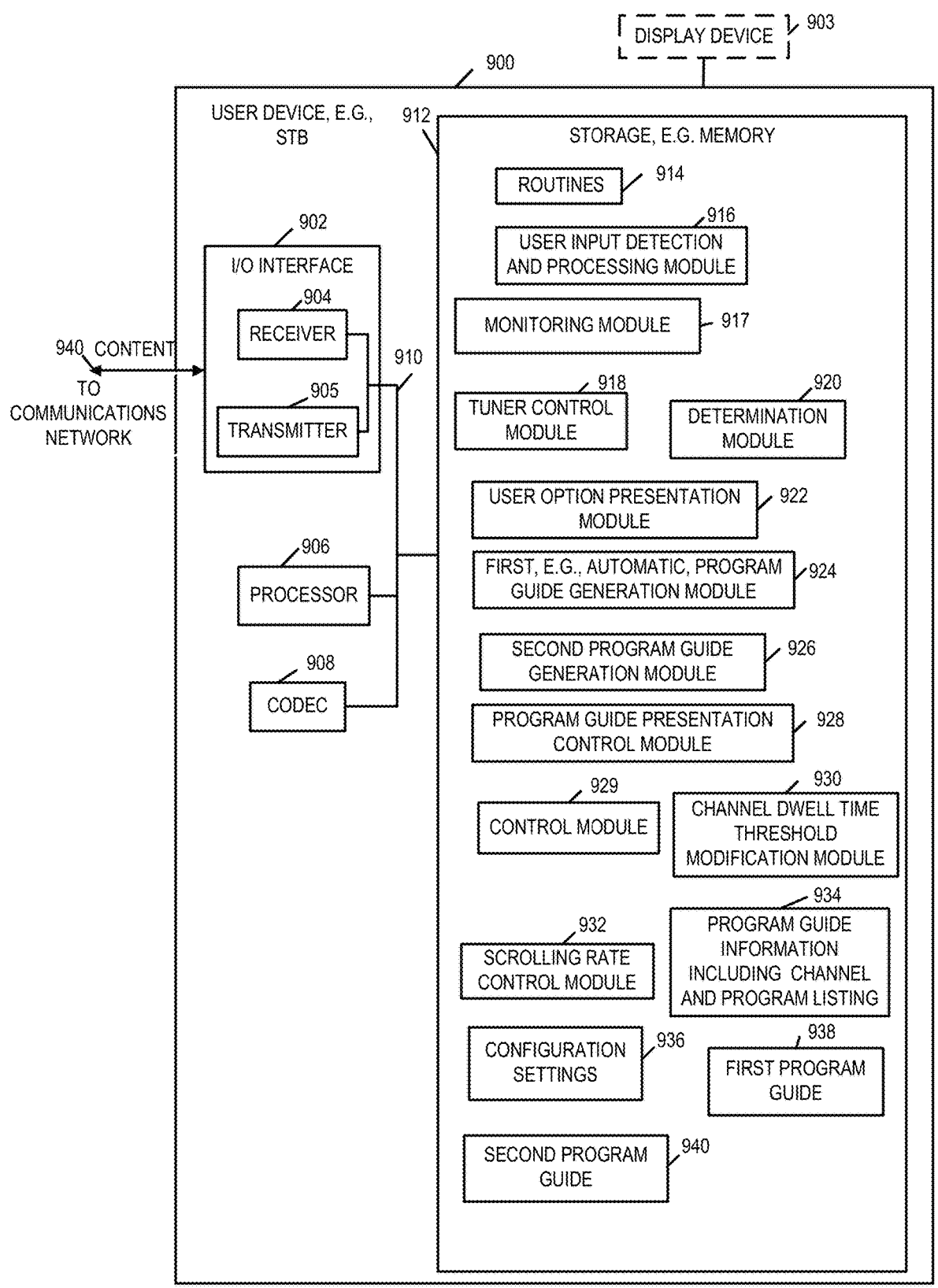
FIG. 9 illustrates an exemplary user device, e.g., set top box, which may be used in the exemplary communications network of FIG. 1.

FIG. 9 illustrates an exemplary user device, e.g., set top box (STB), 900 implemented in accordance with one exemplary embodiment. The exemplary STB 900 may be used as the STB 112 of the system shown in FIG. 1. In various embodiments the user device 900 is configured to implement the method of flowcharts 200 and 300 to control the operation of the user device 900 in accordance with the invention.

As shown, the user device 900 is optionally coupled to a display device 903, e.g., a monitor and/or a Television (TV). The STB 900 includes an Input/Output (I/O) interface 902, a processor 906, a codec (Coder/Decoder) module 908, and a storage device, e.g., a memory 912, coupled together via a bus 910. The various elements of the STB 900 can exchange data and information over the bus 910. Via the I/O interface 902, the STB 900 can exchange signals and/or information with other devices and/or system elements such as the server/storage system 122 in the network headend 102 of region 1, via the communications network 176. The I/O interface 902 supports the receipt and/or transmission of content and/or other information from/to different servers, e.g., the BFS server 124, SDV server 126 etc., as indicated by arrow 940. To support the receipt and transmission of information, the I/O interface 902 includes a receiver 904 and transmitter 905. The receiver 904 includes a tuner-demodulator. The I/O interface 902 in various embodiments further includes, e.g., an infrared signal receiver to receive signals from a user remote control device. The I/O interface 902 in various embodiments is configured to monitor for user input signals, e.g., from user remote control devices.

The processor 906, e.g., a CPU, executes routines 914 stored in the memory 912 and, under direction of the routines 914, controls the STB 900 to operate in accordance with the invention. The processor 906 is responsible for controlling the general operation of the set top box 900 including, e.g., presentation of automatic program guide and/or programs for display. To control the STB 900, the processor 906 uses information and/or routines including instructions stored in memory 912. Routines 914 include communications routines and set top box control routines. The Codec 908 is implemented as a module and is capable of performing encoding and/or decoding operations on a digital data stream or signal.

In addition to the routines 914, the memory 912 includes a user input detection and processing module 916, a monitoring module 917, a tuner control module 918, a determination module 920, a user option presentation module 922, a first, e.g., automatic, program guide generation module 924, a second, e.g., non-automatic, program guide generation module 926, a program guide presentation control module 928, a control module 929, a channel dwell time threshold modification module 930, a scrolling rate control module 932, program guide information 934, user configuration settings 936, first program guide 938 and second program guide 940.

User input detection and processing module 916 is configured to detect a user input signals, e.g., from a control device such as remote control 116. Signals from the remote control may be received via I/O interface 902 which includes, in addition to a cable network interface, an IR (infrared) or radio interface for receiving signals from a remote control device. The input detection module 916 determines, on receipt of a signal, e.g., control signal providing user input, as to what type of control signal is received and/or what type of selection has been made by the user, e.g., channel up/down selection, a program guide selection, a channel selection, menu/settings selection, etc.

The monitoring module 917 is configured to monitor channel dwell time for which a user dwells on a channel. The monitoring module 917 includes a timer that is used to determine the time channel dwell time on a displayed channel. The output of the monitoring module is provided to the determination module 920 and is used to determine whether or not the channel dwell time conditions for presentation of automatic program guide are satisfied.

The tuner control module 918 is configured to control a tuner-demodulator in the device 900 to tune to a frequency corresponding to a program channel to be displayed. In some embodiments the tuner control module 918 consults the program guide information 934 including channel information received from the headend 102 to determine the frequency corresponding to the user selected channel so that the tuner can tune to the correct frequency.

The determination module 920 is configured to determine whether a channel dwell time reported by the monitoring module 917 is greater than or equal to a channel dwell time threshold in use. In various embodiments the channel dwell time threshold in use is stored in the memory as part of the configuration settings 936. The determination module 920 is further configured to determine if the channel dwell time in use is less than a first predetermined channel dwell time threshold. In various embodiments the first predetermined channel dwell time threshold is either preconfigured by the device 900 manufacturer or set by the user or another administrator.

The user option presentation module 922 supports and facilitates the interaction between the STB 900 and the user operating STB 900. The user option presentation module 922, in some embodiments, controls presentation of prompts/interactive messages to the user of the STB 900 on the display device 903, providing the user an opportunity to select and respond to a presented option. For example, in some embodiments following a user input signal detection indicating that the user has requested to view program guide the user option presentation module 922 is configured to present an option to the user to choose between a first, e.g., automatic, program guide 938 or a second, e.g., non-automatic, program guide 940 for display. The user's response to the prompts are detected and the processor 906 controls the STB 900 to perform the functions in accordance with the user's responses. In various embodiments various other interactive messages discussed earlier are presented to the user by the user option presentation module 922 in accordance with the features of the invention.

The first program guide generation module 924 is configured to generate the first, e.g., automatic, guide. The first program guide generation module 924 uses program guide information 934 including the program and channel listing information received from the headend 102 to generate the first program guide 938 which is the output of module 924. In some embodiments the program guide information 934 includes a listing of channels and programming content scheduled to be on those channels along with on air scheduled timing information for the programming content as well as other relevant information used by the STB 900 in obtaining the programming content. Similarly, the second program guide generation module 926 is configured to generate the second, e.g., non-automatic, guide. The second program guide generation module 926 uses program guide information 934 including the program and channel listing information received from the headend 102 to generate the second program guide 940 which is the output of module 926.

The program guide presentation control module 928 is configured to control presentation of a program guide, e.g., first or second program guide, in accordance with the features of the invention. In some embodiments the user can configure the device 900 to display the first (automatic) program guide whenever the user requests presentation of a program guide, e.g., when program guide button is pressed on the remote control. In some such embodiments when the user selects program guide button from the remote control the guide presentation control module 928 presents the automatic program guide 938 for display. In some embodiments when the user indicates that a second, e.g., non-automatic, program guide should be presented the guide presentation control module 928 is configured to present the second program guide 940 for display.

In accordance with one feature of various embodiments, while viewing a displayed channel when the user channel change selection is detected, e.g., pressing of up/down button, and the dwelling time on the displayed channel is greater than or equal to the dwell time threshold in use, the program guide presentation control module 928 controls the tuner in the device 900 to tune to the automatic program guide channel and controls automatic presentation of the automatic program guide 938 on the display device 903. In various embodiments the program guide presentation control module 928 is further configured to highlight a portion of the displayed program guide 938, the highlighted portion including a program channel. In various embodiments the program guide presentation control module 928 is further configured to perform automatic scrolling through the program channels while the automatic program guide is displayed. In some embodiments, as part of controlling the presentation of the automatic program guide, the program guide presentation control module 928 is further configured to change the program channel information being displayed so that the program channel in the highlighted portion of the program guide changes, e.g., as the scrolling occurs. In some embodiments when a channel up change selection by the user triggers the automatic display of the first program guide 938 the presentation control module 928 sequentially displays program channel information, in the highlighted portion of the displayed program guide, corresponding to higher number program channels as part of changing the program channel information in the highlighted portion of the displayed guide. In some embodiments when a channel down change selection by the user triggers the automatic display of the first program guide 938 the presentation control module 928 sequentially displays program channel information, in the highlighted portion of the displayed program guide, corresponding to lower number program channels as part of changing the program channel information in the highlighted portion of the displayed guide.

The control module 929 is configured to control the STB 900 to switch from displaying the automatic program guide 938 to outputting the program channel included in the highlighted portion of the displayed guide in response to a user channel change selection (e.g., channel up or down selection) while the automatic program guide 938 is being displayed. The user channel change selection is detected by the user input detection and processing module 916 which provides an input to the control module 929 for taking further action, e.g., perform switching. In some embodiments the user input detection and processing module 916 is further configured to determine if the user channel change selection (e.g., up or down selection) which triggered the outputting of the highlighted program channel in place of the first program guide is different from the user channel change selection which triggered the automatic display of the first program guide.

The channel dwell time threshold modification module 930 is configured to modify, e.g., reduce or increase, a channel dwell time threshold in use by the user device 900. In some embodiments the dwell time threshold modification module 930 changes the dwell time threshold in response to a user input, e.g., as discussed in flowchart 300. In some embodiments the channel dwell time threshold modification module 930 is configured to temporarily reduce the dwell time threshold used to enable program guide presentation by temporarily changing the dwell time threshold from a first dwell time threshold to a second dwell time threshold, the second dwell time threshold being shorter than said first dwell time threshold. In some embodiments the channel dwell time threshold modification module 930 is configured to perform the temporary reduction when it is determined that a user channel change selection (e.g., up or down channel selection) which triggered outputting of a highlighted program channel in place of the automatic program guide is different from the user channel change selection which triggered the automatic display of the automatic program guide. In some embodiments the temporary reduction in the dwell time threshold remains in effect until the temporary dwell time threshold is satisfied or the user makes a channel change selection prior to the temporary dwell time threshold being satisfied.

The scrolling rate control module 932 controls the scrolling rate used to scroll through the channel listing displayed as part of the automatic program guide 938. The scrolling rate control module 932 controls the scrolling rate based on the scrolling rate specified in the configuration settings 936. In some embodiments the scrolling rate control module 932 is configured to change, e.g., reduce or increase, the scroll rate used to scroll through the program channels while the automatic program guide is displayed, e.g., in response to a user control signal indicating increase or decrease in the scrolling rate.

Program guide information including channel and program listing 934 is received from the headed 102 and is used by the first program guide generation module 924 o generate the first program guide 938 and by the second program guide generation module 926 to generate the second program guide 940. In some embodiments the program guide generation modules 924, 926 request from a server, e.g., such as server 124 in the headend 102, program guide information 934.

The user configuration settings 936 are stored in the memory 912 and may be updated upon detecting a change in the settings, e.g., made by the user and/or a temporary change by another element of user device 900 in accordance with the invention. The configuration settings information 936 include, among other things, first, e.g., automatic, guide 938 settings including channel dwell time threshold, scrolling rate, guide dwell time threshold etc. In some embodiments the setting 936 further include information indicating whether the user would like to view the first guide 938 or the second guide 940 when a program guide button is pressed on the user remote control, e.g., in the embodiments where a full functionality-full key remote control is used. In such embodiments, when automatic program guide option is enabled by the user, then upon user's selection of the program guide button on the remote control, the first program guide 938 is presented by default. When the automatic program guide option is enabled option is not enabled, the user option presentation module 922 provides an option to the user to select first or second regular program guide for display.

In various embodiments where a limited functionality-limited key remote control is used, automatic program guide is enabled by default since in such remote controls there is no program guide button available. Accordingly in such embodiments the first program guide 938 is automatically presented upon detection of channel change selection by the user (e.g., pressing of channel up or down key on the remote) when the channel dwell time threshold conditions are satisfied.

In some embodiments various modules in the user device 900 are implemented fully in hardware within the processor 906, e.g., as individual circuits. In other embodiments some of the modules are implemented, e.g., as circuits, within the processor 906 with other modules being implemented, e.g., as circuits, external to and coupled to the processor 906. Alternatively, in some other embodiments rather than being implemented as circuits, all or some of the modules may be implemented in software and stored in the memory of the user device 900 with the modules controlling operation of the user device 900 to implement the functions corresponding to the modules when the modules are executed by a processor, e.g., processor 906.

In still other embodiments, various modules are implemented as a combination of hardware and software, e.g., with a circuit external to the processor 906 providing input to the processor 906 which then under software control operates to perform a portion of a module's function.

While shown in the FIG. 9 embodiment as a single processor 906, e.g., computer, within device 900, it should be appreciated that processor 906 may be implemented as one or more processors, e.g., computers. When implemented in software, the modules include code, which when executed by the processor 906, configure the processor, e.g., computer, to implement the function corresponding to the module. In some embodiments, processor 906 is configured to implement each of the modules.

Completely hardware based or completely software based modules may be used. However, it should be appreciated that any combination of software and hardware (e.g., circuit implemented) modules may be used to implement the functions. As should be appreciated, the modules shown in FIG. 9 control and/or configure the user device 900 or elements therein such as the processor 906 to perform the functions of the corresponding steps illustrated and/or described in the method of flowcharts 200 and 300.

Figure 10:
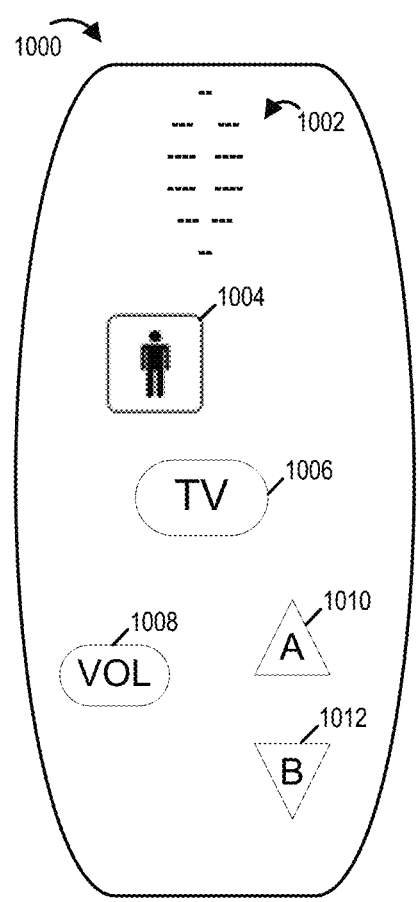
FIG. 10 illustrates an exemplary control device, e.g., remote control, which may be used in the exemplary communications network of FIG. 1.

FIG. 10 illustrates an exemplary remote control device 1000 implemented in accordance with some embodiments of the invention. The remote control device 1000 may be used as the remote control 116 of FIG. 1 in some embodiments and can be used to control a user device such as STB 900 illustrated in FIG. 9, e.g., by providing user input signals. In some embodiments the remote control device 1000 is implemented as a limited functionality-limited key/button control device. In some embodiments the remote control device 1000 is a wired hospital bed remote control device.

The remote control 1000 has an intuitive button layout making it easy for a user to use it. As illustrated in the figure, remote control 1000 includes a speaker 1002 which allows a user to listen to the audible content being output by a user device, e.g., STB 900, being controlled by the remote control 100. In some embodiments the user can choose to listen to the audible content through the speaker 1002 or through the speakers normally built in the displaying device, e.g., Television. The human icon is provided on the button 1004 is provided on the remote control 1000 using which a monitoring system can be alerted that the user of remote control 1000 needs assistance. For example, the user can press the button 1004 to request assistance, e.g., from a nurse or another individual who will be alerted when a signal is sent to a monitoring system monitored by the nurse or the other individual.

The TV button 1006 is provided to power up and power down one or more user devices, e.g., such as STB 900, and/or a television. As shown in FIG. 10 embodiment the remote control 1000 does not include number keys for controlling program channel selections which is normally provided in home remote control devices. However remote control 1000 includes large up and down arrow buttons 1010 and 1012 marked "A" and "B" respectively for controlling program channel selections. The remote control 1000 in some embodiments further includes a volume (VOL) button 1008 which can be selected to first present volume controls, e.g., on the television or other display device, and once the volume controls are displayed the up and down buttons 1010, 1012 can be used to increase or reduce the volume corresponding to the programming content being displayed to the user.

Various features of the invention allow the user of remote control 1000 to easily interact with a program guide, e.g., automatic program guide, with the limited keys provided on the remote control 1000. In various embodiments the up and down control buttons 1010, 1012 of the remote control 1000 are used in combination with time, e.g., between button selections, to control and interact with a program guide. In various embodiments a user may switch between channels which are displayed on TV using the up and down arrows to browse through the channels. In accordance with one aspect, after dwelling on a channel for at least a predetermined time, upon making a channel up or down selection using the up or down buttons 1010, 1012 on the remote 1000, the user is presented with a first program guide, e.g., program guide 401. In some embodiments the program guide automatically scrolls to present program listings corresponding to the channels in the direction of the channel change button that was pressed with the current channel being presented in a highlighted portion at the center of the grid guide. While the automatic program guide is being displayed, if the user selects channel up button 1010 or channel down button 1012, the highlighted program channel is selected and presented to the user in place of the displayed program guide.

Figure 11:
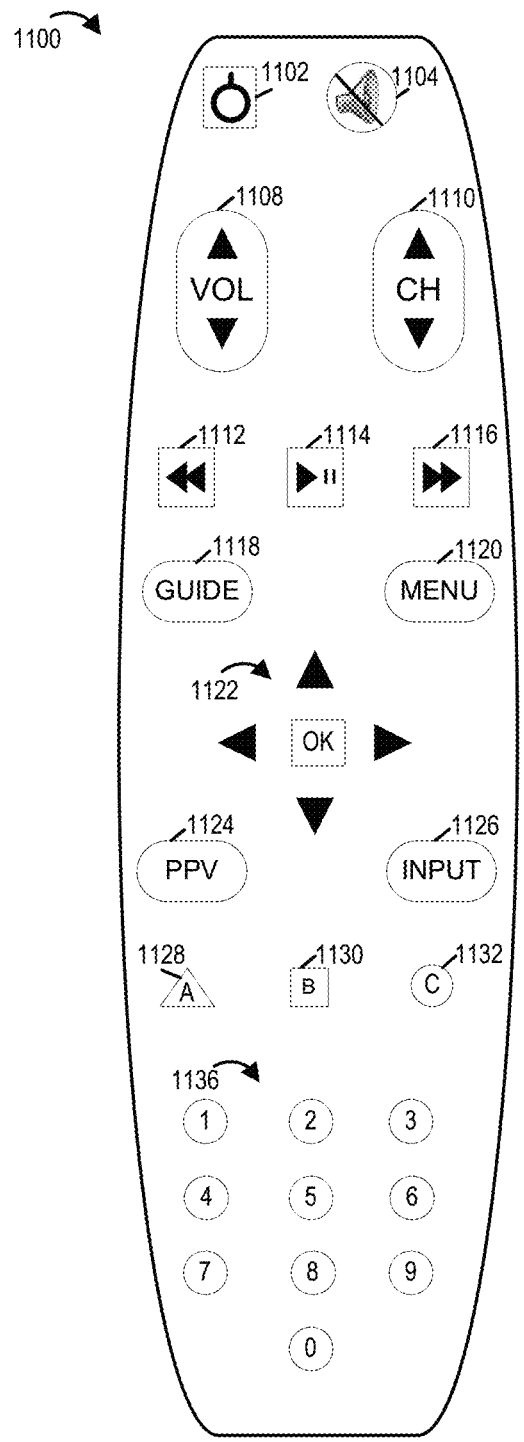
FIG. 11 illustrates another exemplary remote control device which may be used in the exemplary communications network of FIG. 1.

FIG. 11 illustrates another exemplary remote control device 1100 implemented in accordance with some embodiments of the invention. The remote control device 1100 may be used as the remote control 116 of FIG. 1 in some embodiments and can be used to control a user device such as STB 900 illustrated in FIG. 9, e.g., by providing user input signals.

In contrast to the remote control device 1000, the remote control 1100 is implemented as a full functionality-full keys/button control device. As illustrated in the figure, remote control 1100 includes a power on/off button 1102 to turn the user device, e.g., STB 900 and/or TV, on and off, a mute button 1104 to turn off the volume, a volume control button 1108 which can be pressed both ways up or down to increase or decrease the volume of the TV and/or home theater system, and a channel up and down button 1110 which can be pressed both ways up or down to make channel selection. The channel up and down button 1110 can be used to move through on-screen menus and/or interact with the program guide in accordance with the features of the invention.

The three buttons 1112, 1114 and 1116 are used to input trick play commands and control viewing of recorded content. The reverse button 1112 is used for performing a rewind operation, the play button 1114 is used to play and pause content while the forward button 1116 is used for performing a forward operation. The guide button 1118 can be used to display program guide, the menu button 1120 is to present a menu with device, e.g., user device 900, settings and other configurable functions of the user device being controlled. The Pay Per View (PPV) button 1124 is used to display information regarding available PPV and on-demand content. The input button 1126 allows the user to select TV input source when the TV is connected to multiple sources, e.g., STB device, DVD player, gaming console etc., via different inputs.

Reference 1122 refers to the group of buttons including four arrows and an "OK" button that allows the user to move through an on-screen menu or program guide to highlight selections while moving from one item to the next. The "OK" button in the middle can be used to select the highlighted item. The "A" "B" "C" buttons 1128, 1130, 1132 perform actions which are sometimes prompted on the display device screen, e.g., make on screen decisions such as press A 1128 for "YES" and B 1130 for "NO" in response to an on screen prompt presented to the user. The number pad 1136 allows the user to enter the number of a desired channel for tuning to the channel and displaying the content.

In some embodiments a customer uses the remote control 1100 to interact with a program guide, e.g., automatic program guide 401 or non-automatic guide 501. In various embodiments the up and down controls on the up down button 1110 of the remote 1100 are used in combination with time, e.g., between button selections, to control and interact with the program guide. Thus the remote control 1100 can be used to access and interact with a program guide in the similar manner as discussed above with regard to FIG. 10. In addition many more functions can be performed to control the user device, e.g., STB 900, since the remote control 1100 has more in built functions and input keys/buttons. Still however a user can simply use the up down button 1110 in combination with time to interact with the exemplary automatic program guide 401 in accordance with the features of the invention.

While monthly cable cost remains the main reasons why video subscribers choose to disconnect, the overall navigation experience and video quality are important factors that affect a subscriber's decision whether to stay with a service provider or quit. Video subscribers, who are healthy and possess a full range of mobility, almost without fail associate remote control for cable set top boxes with all numeric/alphabetic, DVR, On Demand, Mute, Last, Options, Info, Guide, Menu, TV, STB, PIP, etc buttons. There are video viewers who are severely handicapped in their ability to scroll or surf channels, navigate through a program guide, and/or tune to a desired channel. Sometimes it is because they are equipped with button limited remote controllers (such as the hospital bed remote controls). It is challenging for a service provider to provide even more enhanced video viewing and guide navigation experience consistently to viewers who are equipped with either media rich or button limited remote controls.

Various embodiments of the present invention describe novel and unique methods and apparatus to enable the service providers to further enrich resident digital navigator or on screen navigation application, e.g., program guide, with functions that allow video viewers the option to either channel tune and/or view digital program listings (or associated information), visually seek program information without having to interact with the program guide via the remote control, or to virtually seek and tune to a channel of choice with minimal key presses, e.g., from various remote Some embodiments are well suited for implementation where user devices such as set top boxes and TVs are operated by user with disability and/or operated using a controller with limited functions and keys. Thus some features of the present invention provide enhanced video experience when operating with highly constrained/limited controllers.

In various embodiments system elements described herein are implemented using one or more modules which are used to perform the steps corresponding to one or more methods of the present invention, for example, monitoring a dwell time on a channel, determining if the dwell time exceeds a predetermined dwell time threshold used to enable program guide presentation, automatically presenting, e.g., displaying, a program guide to the user, receiving a user input signal, etc. Each step may be performed by one or more different software instructions executed by a computer processor, e.g., a central processing unit (CPU). In some embodiments the modules may be implemented in software. In some embodiments the modules may be implemented in hardware, e.g., as circuits. In some embodiments the modules may be implemented in a combination of hardware and software.

At least one system implemented in accordance with the present invention includes a means for implementing each of the various steps which are part of the methods of the present invention. Each means may be, e.g., an instruction, processor, hardware circuit and/or combination of elements used to implement a described step. Many of the above described methods or method steps can be implemented using machine, e.g., computer, executable instructions, such as software, included in a machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow. Such variations are to be considered within the scope of the invention.

What is claimed is:

1. A method of operating a device to implement a program guide, comprising:
    modifying a program channel lineup to generate a modified program lineup, said modifying the program channel lineup including placing an automatic guide channel at a first position and at a second position in the program channel lineup, said first and second positions being adjacent, in said modified program lineup, a position of a current channel being displayed; and
    taking an action based on the modified program channel lineup in response to a user pressing an up button or a down button on a remote control.

2. The method of claim 1, wherein said step of modifying a program channel lineup includes adding the automatic program guide channel to the program channel lineup above the current channel being displayed and also adding the automatic program guide channel to the program channel lineup below the current channel being displayed.

3. The method of claim 2, wherein taking an action based on the modified program channel lineup in response to the user pressing an up or down button on the remote control includes tuning to the automatic program guide channel in response to the user pressing said up or down button on the remote control.

4. The method of claim 3, wherein said automatic program guide channel has a single channel number which is placed both above and below the channel number of the current channel in said modified program channel lineup.

5. The method of claim 3, further comprising:
    automatically displaying a program guide in response to the user channel change selection indicated by the user pressing an up or down button.

6. The method of claim 5, further comprising:
    automatically scrolling through program channels while displaying said program guide; and
    wherein automatically displaying a program guide includes:
        highlighting a portion of the displayed program guide, said highlighted portion including a program channel.

7. The method of claim 5, further comprising:
in response to a user channel change selection being made while said program guide is being displayed, switching from displaying said program guide to outputting a highlighted program channel.

8. The method of claim 2,
wherein said remote control does not include number keys for controlling program channel selections.

9. The method of claim 8,
wherein said user device is a set top box in a hospital or rehabilitation center; and
wherein said remote control includes only up and down arrow buttons for controlling program channel selections; and
wherein said remote control is a wired hospital bed remote control device.

10. The method of claim 9, further comprising:
monitoring user input; and
changing a scroll rate used to control automatic channel scrolling during presentation of said program guide as a function of said monitored input.

11. The method of claim 10, wherein monitoring user input includes monitoring the time between user selection of channel change buttons.

12. The method of claim 1, further comprising:
displaying a current channel prior to performing said step of modifying the program channel lineup.

13. The method of claim 1, wherein a program guide is not displayed while displaying the current channel.

14. A system comprising:
a display; and
a user device coupled to the display, the user device including a processor configured to control the user device to:
modify a program channel lineup to generate a modified program lineup, said modifying the program channel lineup including placing an automatic guide channel at a first position and at a second position in the program channel lineup, said first and second positions being adjacent, in said modified program lineup, a position of a current channel being displayed; and
take an action based on the modified program channel lineup in response to a user pressing an up button or a down button on a remote control.

15. The system of claim 14, wherein said processor controls the user device, as part of modifying the program channel lineup, to add the automatic program guide channel to the program channel lineup above the current program channel being displayed and also add the automatic program guide channel to the program channel lineup below the current channel being displayed.

16. The system of claim 15, wherein said processor controls the user device, as part of taking an action based on the modified program channel lineup in response to the user pressing an up or down button on the remote control to tune to the automatic program guide channel in response to the user pressing said up or down button on the remote control.

17. The system of claim 16, wherein said automatic program guide channel has a single channel number which is placed both above and below the channel number of the current channel in said modified program channel lineup.

18. A method of operating a device to implement a program guide, comprising:
modifying a program channel lineup to generate a modified program lineup, said modifying the program channel lineup including placing a guide channel at multiple locations within the program channel lineup, said multiple locations including a first location above a position of a first program channel in the program channel lineup and a second location below the first program channel; and
taking an action based on the modified program channel lineup in response to a user pressing an up button or a down button on a remote control.

19. The method of claim 18, wherein said step of modifying the program channel lineup includes placing the guide channel immediately above and immediately below the first program channel.

20. The method of claim 19,
wherein said step of modifying the program channel lineup includes displaying the same channel number for said guide channel in said program guide at both said first location and said second location; and
wherein said first program channel is a current channel being displayed.

* * * * *